(12) United States Patent
Bando et al.

(10) Patent No.: US 9,905,838 B2
(45) Date of Patent: Feb. 27, 2018

(54) ELECTRODE AND METHOD OF MANUFACTURING THE SAME

(75) Inventors: Toshinori Bando, Kyoto (JP); Yoshikatsu Ohtani, Kyoto (JP); Kazuya Okabe, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 1036 days.

(21) Appl. No.: 13/565,683

(22) Filed: Aug. 2, 2012

(65) Prior Publication Data

US 2013/0048340 A1 Feb. 28, 2013

(30) Foreign Application Priority Data

Aug. 30, 2011 (JP) .................. 2011-186750
Aug. 30, 2011 (JP) .................. 2011-186843

(51) Int. Cl.
| | | |
|---|---|---|
| *H01M 4/133* | (2010.01) | |
| *H01M 4/1393* | (2010.01) | |
| *H01M 4/66* | (2006.01) | |
| *H01G 11/22* | (2013.01) | |
| *H01G 11/84* | (2013.01) | |
| *H01M 4/04* | (2006.01) | |
| *H01M 2/26* | (2006.01) | |
| *H01M 2/30* | (2006.01) | |
| *H01M 4/587* | (2010.01) | |
| *H01M 4/62* | (2006.01) | |

(52) U.S. Cl.
CPC .......... *H01M 4/0404* (2013.01); *H01G 11/22* (2013.01); *H01G 11/84* (2013.01); *H01M 4/133* (2013.01); *H01M 4/1393* (2013.01); *H01M 4/667* (2013.01); *H01M 2/263* (2013.01); *H01M 2/30* (2013.01); *H01M 4/587* (2013.01); *H01M 4/623* (2013.01); *Y02E 60/13* (2013.01)

(58) Field of Classification Search
CPC ..................................... H01G 11/22
USPC ......... 29/623.1, 231.8, 209, 246, 523, 25.03
See application file for complete search history.

(56) References Cited

U.S. PATENT DOCUMENTS

| | | | |
|---|---|---|---|
| 6,335,114 B1 * | 1/2002 | Ueshima et al. ................ 429/94 |
| 6,387,564 B1 * | 5/2002 | Yamashita et al. ............ 429/132 |
| 7,097,673 B2 * | 8/2006 | Dudley et al. ................ 29/623.5 |
| 8,586,239 B2 * | 11/2013 | Sakamoto ...................... 429/217 |
| 8,636,876 B2 * | 1/2014 | Zhang et al. ............. 204/192.15 |
| 2002/0197535 A1 * | 12/2002 | Dudley et al. ................ 429/246 |
| 2003/0134186 A1 | 7/2003 | Shizuki |
| 2004/0202928 A1 * | 10/2004 | Miyamoto et al. ........... 429/137 |

(Continued)

FOREIGN PATENT DOCUMENTS

| | | | |
|---|---|---|---|
| EP | 2426773 A2 * | 8/2011 |
| EP | 2450989 A2 * | 5/2012 |

(Continued)

OTHER PUBLICATIONS

Machine translation of Shibya JPH11354103, 37 pages total.*

*Primary Examiner* — Ula C Ruddock
*Assistant Examiner* — Anna Korovina
(74) *Attorney, Agent, or Firm* — McGinn I.P. Law Group, PLLC.

(57) ABSTRACT

An electrode includes: an electrode plate; a conductive layer formed on the electrode plate; and an active material layer formed continuously on the electrode plate and on the conductive layer, and the electrode plate includes an uncoated region where a surface of the electrode plate is exposed.

20 Claims, 12 Drawing Sheets

(56) References Cited

U.S. PATENT DOCUMENTS

| | | | |
|---|---|---|---|
| 2010/0075225 A1* | 3/2010 | Wilkins et al. | 429/212 |
| 2010/0081052 A1* | 4/2010 | Morishima et al. | 429/211 |
| 2012/0045689 A1* | 2/2012 | Okabe et al. | 429/209 |
| 2012/0058375 A1* | 3/2012 | Tanaka et al. | 429/94 |
| 2012/0115030 A1* | 5/2012 | Tanaka et al. | 429/211 |

FOREIGN PATENT DOCUMENTS

| | | | |
|---|---|---|---|
| JP | 05-028990 A | | 2/1993 |
| JP | 09-097625 A | | 4/1997 |
| JP | 09-274933 A | | 10/1997 |
| JP | 11-144735 A | | 5/1999 |
| JP | 11-213969 A | | 8/1999 |
| JP | 11-312516 A | | 11/1999 |
| JP | 11-354103 A | | 12/1999 |
| JP | 2000-208129 A | | 7/2000 |
| JP | 2000-353514 A | | 12/2000 |
| JP | 2003-100286 A | | 4/2003 |
| JP | 2003-217667 A | | 7/2003 |
| JP | 2005-093236 A | | 4/2005 |
| JP | 2008-060060 A | | 3/2008 |
| JP | 2010-020986 A | | 1/2010 |
| JP | 2012114079 A | * | 5/2010 |
| JP | 2012-064563 A | | 3/2012 |
| JP | 2012-069266 A | | 4/2012 |
| JP | 2012-079592 A | | 4/2012 |
| WO | WO 2010084622 A1 | * | 7/2010 |

* cited by examiner

ELECTRODE AND METHOD OF MANUFACTURING THE SAME

CROSS-REFERENCE TO RELATED APPLICATION

This application is based on Japanese Patent Applications No. 2011-186843 and No. 2011-186750 filed with the Japan Patent Office on Aug. 30, 2011 the entire contents of which are hereby incorporated by reference.

BACKGROUND

1. Technical Field

The present disclosure relates to an electrode and a method manufacturing an electrode.

2. Related Art

An electrode includes, for example, an electrode plate and an active material layer formed on a conductive layer. Such an electrode is used for, for example, a power storage element such as a battery (secondary battery, primary battery, or the like) and a capacitor (electric double layer capacitor or the like). For example, the electrode is included in an electrode assembly, which is a main part of a battery. The electrode assembly includes a positive electrode side electrode and a negative electrode side electrode. Each electrode includes an electrode plate and an active material layer stacked thereon. In many cases, the positive electrode side electrode and the negative electrode side electrode are alternately stacked on each other with a separator interposed therebetween.

In some cases, the adhesion between the electrodes as described above is not sufficiently secured depending on the material of the electrode plate and the active material layer. In view of those cases, an electrode according to JP-A-2008-60060 has a conductive layer (undercoat layer) disposed between an electrode plate and an active material layer. The conductive layer is used for reducing the contact resistance between the electrode plate and the active material layer by improving the adhesion therebetween.

Thus, the provision of the conductive layer between the electrode plate and the active material layer can increase the adhesion strength of the active material layer to the electrode plate and improve the battery capacity or the battery life.

SUMMARY

An electrode includes: an electrode plate; a conductive layer formed on the electrode plate; and an active material layer formed continuously on the electrode plate and on the conductive layer, and the electrode plate includes an uncoated region where a surface of the electrode plate is exposed.

DETAILED DESCRIPTION

Figure 1:
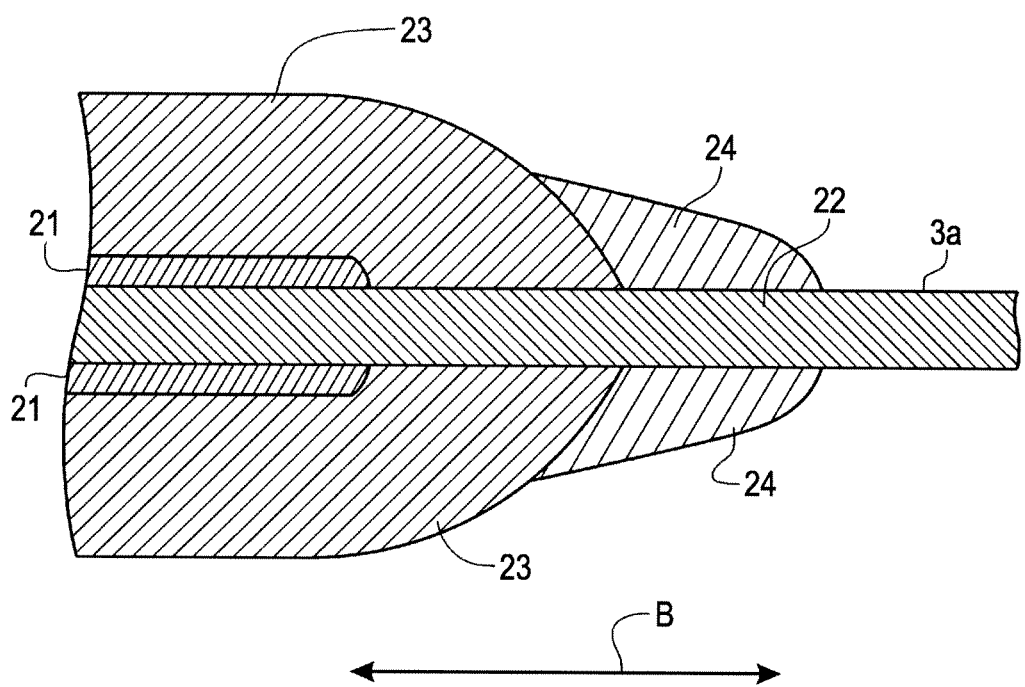
FIG. 1 is a magnified sectional view of a main part according to an embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The provision of the conductive layer between the electrode plate and the active material layer for increasing the adhesion therebetween might cause a problem in a process of manufacturing the electrode. That is, in consideration of the intended purpose of the formation of the conductive layer, the conductive layer is formed so as to completely cover a region where the active material layer serving as a layer provided above the conductive layer is formed. In other words, the region where the conductive layer is formed is generally larger than the region where the active material layer is formed. As a result, the region where the active material layer is formed is completely included in the region where the conductive layer is formed.

Therefore, a part of the conductive layer is exposed at a boundary portion (the vicinity of an edge of the active material layer) between a region where a surface of the electrode plate is exposed (uncoated region) and the region where the active material layer is formed.

The process of manufacturing an electrode includes a step of detecting the position at which the active material layer is formed and performing some kind of processing based on the detected positional information. As for the detection of the position at which the active material layer is formed, the position of an edge of the active material layer is often detected optically.

For optically detecting the position of the edge of the active material layer accurately, it is desirable that the state of reflection light be clearly different on the edges at the both sides of the active material layer.

In general, the state of the light beam reflected on the electrode plate serving as a base and the state of the light beam reflected on the active material layer are clearly different. However, the light beam reflected on the active material layer and the light beam reflected on the conductive layer often have the same type of color. Those reflection light beams are similar to each other and clear discrimination is difficult.

In this manner, a part of a conductor is sometimes exposed in the vicinity of the edge of the active material layer on the electrode plate (at the boundary portion between the uncoated region and the region where the active material layer is formed). In those cases, it is difficult to optically specify the position of the edge of the active material layer accurately. As a result, the detection result includes an error.

This detection error causes the process accuracy to deteriorate in a subsequent step in which the positional information on the edge of the active material layer is utilized, resulting in deterioration of the battery performance.

It is an object of the present disclosure to, even in the case where the conductive layer is provided between the electrode plate and the active material layer, detect the position of the edge of the active material layer accurately.

There are other techniques for increasing the battery capacity from the viewpoint entirely different from the technique in which the conductive layer is used. In one of the techniques, the density of the active material layer is increased by pressing the region where the active material layer is formed after the active material is formed on the electrode plate by application or the like.

The increase in density of the active material layer leads to the increase in content amount of the active material relative to the volume of the battery housing. As a result, the battery capacity relative to the volume of the battery housing is increased. However, such pressing makes it difficult to handle a foil-form electrode plate on which the active material is applied.

On the electrode plate, generally, an uncoated region where a surface of the electrode plate is exposed is formed as a region where electric wiring is formed. When the region where the active material layer is formed is pressed together with the uncoated region, the uncoated region is hardly pressed due to the thickness of the active material layer.

Therefore, in the pressing, the region where the active material layer is formed is extended through the application of the pressing force but the uncoated region is hardly extended. Accordingly, the electrode plate is bent to make it difficult to handle the electrode plate.

Pressing for applying the appropriate pressing force to not just the region where the active material layer is formed but also the uncoated region is considered for preventing the bending of the electrode plate. This can compensate for the shortage of extension of the uncoated region. Thus, the uncoated region and the region where the active material layer is formed have substantially the same extension state. Accordingly, the bending of the electrode plate is prevented.

However, the combination of the technique to provide the thin conductive layer between the electrode plate and the active material layer and the pressing technique to appropriately press each of the region where the active material layer is formed and the uncoated region might lead to a problem in the process of manufacturing the electrode.

As described above, a part of the conductive layer is exposed at the boundary portion between the uncoated region and the region where the active material layer is formed. Although the conductive layer is a thin layer, the region where the conductive layer is exposed in the electrode is slightly thicker than the uncoated region. Therefore, in order to effectively press the uncoated region, pressing is performed on the region except for the region where the conductive layer is exposed.

The region where the active material layer is formed is thicker than the region where the conductive layer is exposed. Therefore, in the pressing performed on the region where the active material layer is formed, the region where the conductive layer is exposed is not pressed effectively.

Therefore, the region (region where the conductive layer is exposed) where the pressing force by the pressing does not work exists between the region where the active material layer is formed and the uncoated region. Accordingly, a space is formed between the region where the active material layer is formed and the uncoated region which have been pressed. This drastically reduces the effects obtained by pressing the uncoated region and causes the electrode plate to be bent.

It is another object of the present disclosure to suppress the bending of the electrode plate as much as possible in the electrode including the electrode plate, the active material layer, and the conductive layer between the electrode plate and the active material layer.

An electrode according to the present disclosure includes an electrode plate, a conductive layer formed on the electrode plate, and an active material layer formed continuously on the electrode plate and on the conductive layer. The electrode plate includes an uncoated region where a surface of the electrode plate is exposed.

In this electrode, the active material layer is formed continuously on the electrode plate and on the conductive layer. Therefore, a part of the active material layer spreads beyond the conductive layer onto the electrode plate. In the spreading part of the active material layer, the conductive layer formed on the electrode plate is not exposed. Therefore, the edge position of the edge of the active material layer can be detected accurately with an optical position detection unit.

In an aspect of an electrode according to the present disclosure, an active material layer includes an active material layer spreading part. In this active material layer spreading part, an edge of the active material layer on an uncoated region side is located closer to the uncoated region side than an edge of the conductive layer.

This aspect is based on one mode of formation of the conductive layer and the active material layer on the electrode plate. In this aspect, the edge of a part of the active material layer on the upper layer side is located closer to the uncoated region side than the edge of the conductive layer on the lower layer side. Accordingly, a part of the active material layer serves as the active material layer spreading part that spreads to the uncoated region side beyond the conductive layer. In the active material layer spreading part, the conductive layer on the lower layer side is not exposed. Thus, the edge position of the active material layer can be detected accurately with the optical position detection unit.

The distance between the edge of the conductive layer and the edge of the active material layer in this active material layer spreading part may be 2 mm or less. In this case, the width of the spreading part of the active material layer from the conductive layer is set to be 2 mm or less. Thus, the deterioration in adhesion strength between the active material layer and the electrode plate can be suppressed sufficiently.

In another aspect of the electrode according to the present disclosure, the electrode plate includes a short-circuiting prevention layer with higher electrical resistance than the electrode plate and this short-circuiting prevention layer is formed on the boundary portion between the active material layer and the uncoated region.

In this aspect, the short-circuiting prevention layer has higher electrical resistance than the electrode plate and is provided on the boundary portion between the active material layer and the uncoated region on at least one of electrode plates on the positive electrode side and the negative electrode side. This makes it possible to suppress or prevent the flow of large short-circuiting current between the positive electrode side electrode and the negative electrode side electrode when the electrodes are brought into contact with each other by the intrusion of foreign matter or the like.

In still another aspect of the electrode according to the present disclosure, the region where the active material layer is formed and the uncoated region on the electrode plate are extended.

This aspect is based on one mode of formation of the conductive layer and the active material layer on the electrode plate. In this aspect, the edge of a part of the active material layer on the upper layer side is located closer to the uncoated region side than the edge of the conductive layer on the lower layer side. Thus, a part of the active material layer spreads beyond the conductive layer to the uncoated region side.

This makes it possible to extend the uncoated region so as to allow the appropriate balance with the extension of the region where the active material layer is formed without considering the existence of the conductive layer.

Here, the region where the active material is formed includes not just the region on the electrode plate where the active material layer is directly formed on the electrode plate but also the region where the active material layer is formed via the conductive layer.

An electrode manufactured by a first method of manufacturing an electrode according to the present disclosure includes an electrode plate, a conductive layer formed on the electrode plate, and an active material layer formed continuously on the electrode plate and on the conductive layer. The electrode plate includes an uncoated region where a surface of the electrode plate is exposed. The active material layer includes an active material layer spreading part. In this active material layer spreading part, an edge of the active material layer on the uncoated region side is located closer to the uncoated region side than an edge of the conductive layer. This manufacturing method includes a step of specifying a position of the active material layer in the active material layer spreading part with an optical position detection unit.

The aspect of the electrode according to this manufacturing method is based on one mode of formation of the conductive layer and the active material layer on the electrode plate. In this aspect, the edge of a part of the active material layer on the upper layer side is located closed to the uncoated region side than the edge of the conductive layer on the lower layer side. Thus, a part of the active material layer serves as the active material layer spreading part that spreads beyond the conductive layer to the uncoated region side.

In the active material layer spreading part, the conductive layer on the lower layer side is not exposed. Therefore, even in the circumstances where the discrimination between the conductive layer and the active material layer is difficult, the position of the active material layer can be detected accurately with the optical position detection unit.

The conductive layer does not exist between the active material layer spreading part and the electrode plate. However, the active material layer spreading part affects the battery operation to a certain degree. The existence of the active material layer spreading part just causes the battery capacity or the like to decrease to some extent.

In addition, the area of the active material layer spreading part is not necessarily large, and may be the minimum. Therefore, the decrease in capacity due to the active material layer spreading part hardly affects the battery capacity on the entire active material layer.

Here, in the aspect of the first method of manufacturing the electrode according to the present disclosure, the distance between the edge of the active material layer in the active material layer spreading part and the edge of the conductive layer is 2 mm or less. Thus, by setting the width of the spreading part of the active material layer from the conductive layer at 2 mm or less, the deterioration in adhesion strength between the active material layer and the electrode plate can be sufficiently suppressed.

In another aspect of the first method of manufacturing the electrode according to the present disclosure, the step of specifying the position of the active material layer corresponds to a step of detecting the positional information on the edge position of the active material layer with the optical position detection unit. Thus, even in the circumstances where the discrimination between the conductive layer and the active material layer is difficult, the edge position of the active material layer can be detected accurately with the optical position detection unit.

This aspect may further include a step of forming a short-circuiting prevention layer with higher electrical resistance than the electrode plate on a boundary portion between the uncoated region and the active material layer on the electrode plate based on the positional information on the edge position of the active material layer.

In the case of forming an electrode assembly by disposing the positive electrode side electrode and the negative electrode side electrode so as to face each other, the region where the active material layer on the negative electrode side is generally formed to be larger than the region where the active material layer on the positive electrode side is formed. This is to allow an expensive positive electrode active material to contribute to the battery operation effectively. Moreover, in a lithium ion battery, by forming the region where the active material layer on the negative electrode side to be larger than the region where the active material layer on the positive electrode side is formed, it is possible to prevent or suppress the occurrence of Li electrocrystallization in a portion where the active material layer on the negative electrode side is not formed during the charging.

In this case, the portion of the positive electrode side electrode where the active material layer on the positive electrode side is not formed faces the negative electrode side electrode. In this state, the intrusion of foreign matter or the like might cause the negative electrode side portion to be in contact with the portion where the active material layer on the positive electrode side is not formed. In this case, large short-circuiting current due to the low electrical resistance in that contact portion might flow.

In view of this, a short-circuiting prevention layer with high electrical resistance may be formed in the portion on the electrode plate on the positive electrode side where the active material layer on the positive electrode side is not formed and which faces the negative electrode side electrode, as described above. This can suppress or prevent generation of short-circuit current.

This short-circuiting prevention layer may be formed accurately along the edge of the active material layer on the positive electrode side. For achieving this, it is effective to detect the edge position of the active material layer on the positive electrode side accurately and to form the short-circuiting prevention layer by utilizing the detection information, as described above.

The region where the active material layer on the positive electrode side is formed may be formed to be larger than the region where the active material layer on the negative electrode side is formed. In this case, it is effective to detect the edge position of the negative electrode active material layer accurately and to form the short-circuiting prevention layer by utilizing the detection information.

Another aspect of the first method of manufacturing the electrode according to the present disclosure further includes a step of setting a cutting position of the electrode plate provided with the conductive layer and the active material layer based on the positional information on the edge position of the active material layer.

In the process of manufacturing the electrode, the electrode plate on which the active material layer and the like are stacked is cut off into plural pieces. Thus, plural electrodes are manufactured at one time. In the case of employing such a manufacturing process, it is preferable that the area of the active material layer on the electrode plate which is subjected to cutting be set accurately. When the electrodes formed by cutting have the active material layers with different areas from each other, the battery capacity is not uniform (varies). In view of this, it is effective to detect the edge position of the active material layer accurately and to set the cutting position by utilizing the detection information.

In another aspect of the first method of manufacturing the electrode according to the present disclosure, the electrode plate is in a rectangular band form, and each of the conductive layer and the active material layer is in a band form extending in the longitudinal direction of the electrode plate so that the uncoated region is located at the edge of the electrode plate in the width direction. Moreover, the active material layer spreading part is formed along the entire length of the boundary portion between the active material layer and the uncoated region.

In this aspect, the conductive layer and the active material layer are formed in a band form in the longitudinal direction on the electrode plate in the rectangular band form. In this aspect, the edge of the active material layer can be detected accurately over the entire length of the boundary portion between the active material layer and the uncoated region that extends in the longitudinal direction of the electrode plate. Thus, each processing on the electrode in the rectangular band form can be performed accurately.

An electrode manufactured by a second method of manufacturing an electrode according to the present disclosure includes an electrode plate, a conductive layer formed on the electrode plate, and an active material layer formed continuously on the electrode plate and on the conductive layer. The electrode plate includes an uncoated region where a surface of the electrode plate is exposed. The active material layer has an active material layer spreading part. In this active material layer spreading part, an edge part of the active material layer on the uncoated region side is located closer to the uncoated region side than an edge of the conductive layer. This manufacturing method includes a step of pressing the uncoated region by applying a pressure force on the uncoated region and a step of pressing the active material layer by applying a pressure force on the region where the active material layer is formed.

The aspect of the electrode according to this manufacturing method is based on one mode of formation of the conductive layer and the active material layer on the electrode plate. In this aspect, the edge of a part of the active material layer on the upper layer side is located closer to the uncoated region side than the edge of the conductive layer on the lower layer side. Accordingly, a part of the active material layer serves as the active material layer spreading part that spreads beyond the conductive layer to the uncoated region side.

In this manufacturing method, the step of pressing the uncoated region is performed on the uncoated region, thereby extending the uncoated region. On this occasion, a pressing position on the uncoated region can be determined so that an extension effect can be obtained to achieve the appropriate balance with the extension effect by the step of pressing the active material layer performed on the region where the active material layer is formed without considering the existence of the conductive layer.

Note that the conductive layer does not exist between the active material layer spreading part and the electrode plate. However, the active material layer spreading part affects the battery operation to a certain degree. The existence of the active material layer spreading part just causes the battery capacity or the like to decrease to some extent.

The area of the active material layer spreading part is not necessarily large, and may be the minimum. Therefore, the decrease in capacity due to the active material layer spreading part hardly affects the battery capacity on the entire active material layer.

Here, the region where the active material is formed includes not just the region on the electrode plate where the active material layer is directly formed on the electrode plate but also the region where the active material layer is formed via the conductive layer.

In an aspect of the second method of manufacturing the electrode according to the present disclosure, the distance between the edge of the conductive layer and the edge of the active material layer in the active material layer spreading part is 2 mm or less. Thus, by setting the width of the spreading part of the active material layer from the conductive layer at 2 mm or less, the deterioration in adhesion strength between the active material layer and the electrode plate can be sufficiently suppressed.

In another aspect of the second method of manufacturing the electrode according to the present disclosure, the electrode plate is in a rectangular band form, and each of the conductive layer and the active material layer is in a band form extending in the longitudinal direction of the electrode plate so that the uncoated region is located at the edge of the electrode plate in the width direction. Moreover, the active material layer spreading part is formed along the entire length of the boundary portion between the active material layer and the uncoated region.

In this aspect, each of the conductive layer and the active material layer is formed on the electrode plate in the rectangular band form in a band form so as to extend in the longitudinal direction of the electrode plate. In this aspect, the uncoated region can be effectively extended over the entire length of the boundary portion between the active material layer and the uncoated region extending in the longitudinal direction of the electrode plate.

An electrode and a method of manufacturing the electrode according to an embodiment of the present disclosure are hereinafter described with reference to the drawings. This embodiment shows an electrode that can be used for a nonaqueous electrolyte secondary battery (more specifically, lithium ion battery) and a method of manufacturing the same.

[Structure of Nonaqueous Electrolyte Secondary Battery RB]

Figure 12:
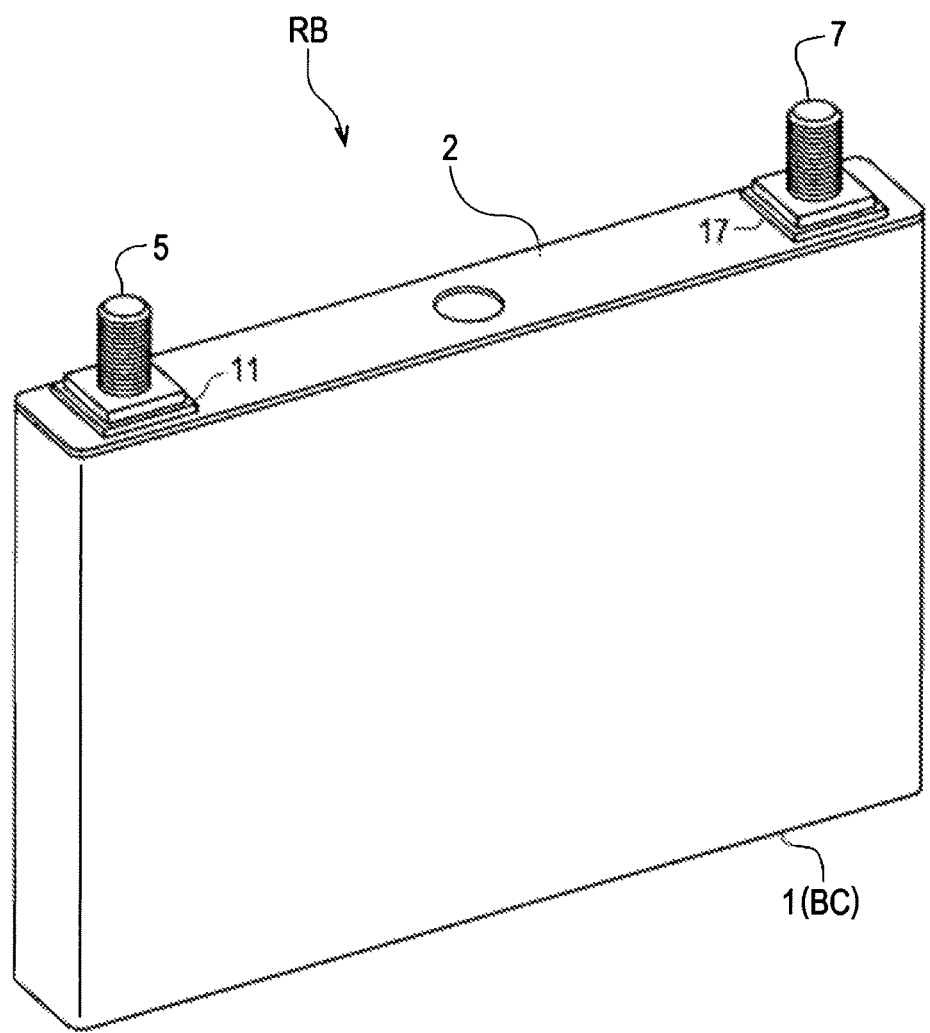
FIG. 12 is an appearance perspective view illustrating the battery according to the embodiment of the present disclosure.

As depicted in the perspective view of FIG. 12, a nonaqueous electrolyte secondary battery RB according to this embodiment includes a battery housing BC (hereinafter simply referred to as housing BC). The housing BC includes a case body 1 with a bottomed cylindrical (more specifically, bottomed rectangular cylindrical) shape, and a lid part 2. The lid part 2 covers an open surface of the case body 1 and is welded thereto. The lid part 2 is a strip-form rectangular plate. On a surface of the lid part 2 on the outer side of the housing BC, a terminal bolt 5 serving as an electrode terminal for a positive electrode and a terminal bolt 7 serving as an electrode terminal for a negative electrode are attached. The case body 1 has a flat and substantially cubic solid shape in accordance with the shape of the lid part 2. As a result, the housing BC has a flat and substantially cubic solid shape as a whole.

Figure 11:
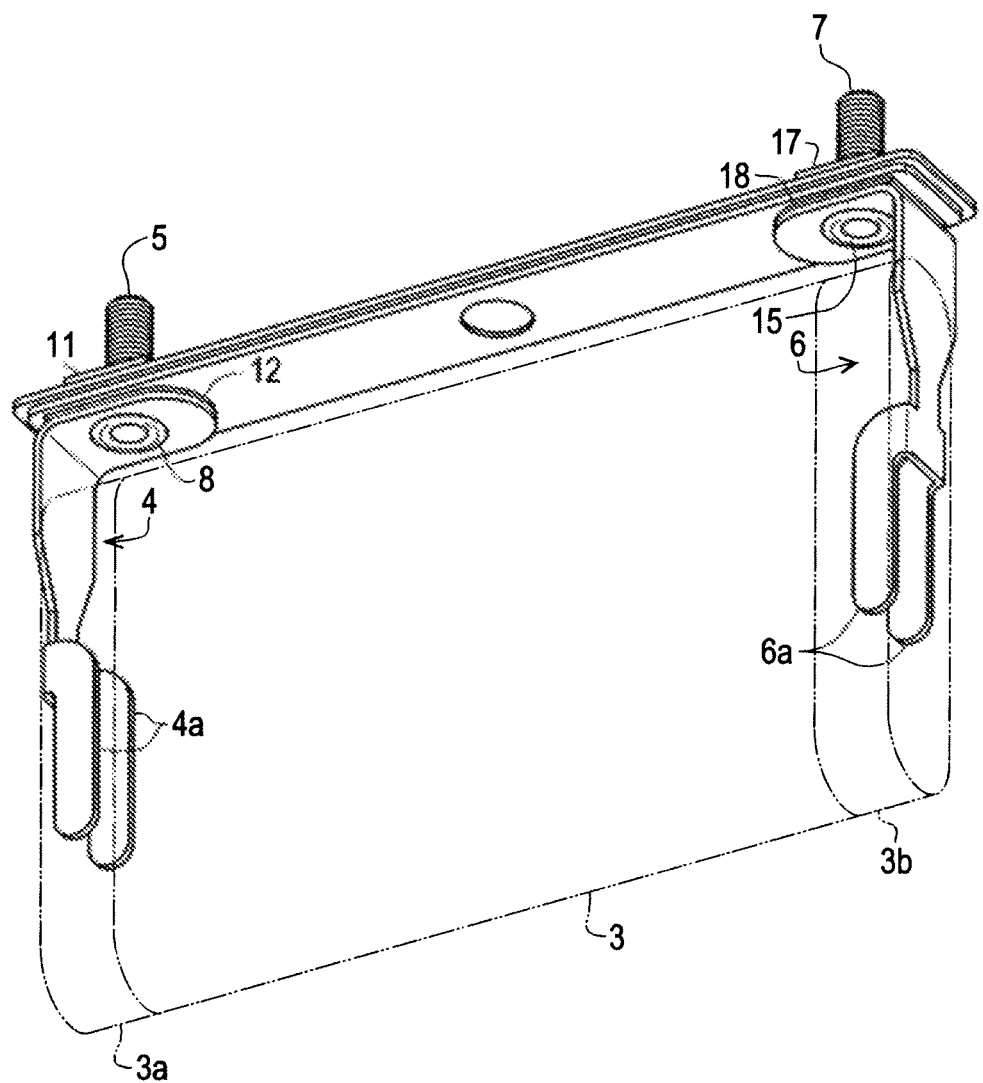
FIG. 11 is a perspective view illustrating an internal structure of a battery according to the embodiment of the present disclosure.

FIG. 11 is a perspective view illustrating the secondary battery RB seen from below the secondary battery RB. FIG. 11 depicts an inner structure (structure inside the housing BC) of the secondary battery RB. As this figure depicts, an electrode assembly 3 drawn with a two-dot chain line and current collectors 4 and 6 are housed in the housing BC. These are immersed in electrolyte.

The current collectors 4 and 6 are members for electrically connecting the electrode assembly 3 and the terminal bolts 5 and 7. The current collectors 4 and 6 each include a conductor.

The current collectors 4 and 6 have substantially the same shape and are arranged symmetrically, hut are formed of different materials from each other. The current collector 4 on the positive electrode side is formed of aluminum. On the other hand, the current collector 6 on the negative electrode side is formed of copper.

The current collectors 4 and 6 are formed by bending a narrow member with a substantially rectangular plate shape formed of the metal material into a predetermined shape. The current collectors 4 and 6 are bent by approximately 90 degrees in the vicinity of the end of the lid part 2 in the longitudinal direction. That is, each of the current collectors 4 and 6 has a bent shape like a letter of L. Therefore, each of the current collectors 4 and 6 has a lateral part that extends along a surface of the lid part 2 on which the terminal bolts 5 and 7 are provided and a vertical part (that extends in the normal line direction of the lid part 2) that extends downward (to the side not provided with the terminal bolts 5 and 7). The vertical part (vertical posture part) of each of the current collectors 4 and 6 is further bent toward the electrode assembly 3. The bent parts include connection parts 4a and 6a which are connected to the electrode assembly 3.

The current collectors 4 and 6 with a shape like a letter of L are arranged along the lid part 2 and a narrow side face of the case body 1 that ranges orthogonal to an end of the lid part 2 in the longitudinal direction.

The electrode assembly 3 is an electrode assembly of so-called a winding type. In other words, the electrode assembly 3 includes a positive electrode side electrode and a negative electrode side electrode which are in a rectangular band form, and a separator in a rectangular band form interposed therebetween. These are wound so as to form a stack of layers. The positive electrode side electrode is an electrode plate on the positive electrode side (hereinafter referred to as positive electrode plate) on which an active material is applied. The negative electrode side electrode is an electrode plate on the negative electrode side (hereinafter referred to as negative electrode plate) on which an active material is applied. The electrode plate includes a conductive material and is in a rectangular band form. Note that the electrode is later described in detail.

As for the electrode assembly 3, an uncoated region 3a of the wound positive electrode side electrode (portion where a surface of the positive electrode plate is exposed because the positive electrode active material is not applied) protrudes sideward (in the direction orthogonal to the longitudinal direction of the positive electrode plate). Moreover, an uncoated region 3b of the wound negative electrode side electrode (portion where a surface of the negative electrode plate is exposed because the negative electrode active material is not applied) protrudes sideward on the opposite side (in the direction orthogonal to the longitudinal direction of the negative electrode plate).

The positive electrode side electrode, the negative electrode side electrode, and the like are wound so that the electrode assembly 3 has a flat shape. This allows the electrode assembly 3 to be compatible with the flat housing BC.

The posture of the electrode assembly 3 in the case body 1 is described. In the case body 1, the axis of winding of the positive electrode side electrode or the like is substantially parallel to the longitudinal direction of the lid part 2. As schematically depicted in FIG. 11, the connection part 4a of the current collector 4 is in the uncoated region 3a of the positive electrode side electrode. Similarly, the connection part 6a of the current collector 6 is in the uncoated region 3b of the negative electrode side electrode.

The uncoated region 3a of the positive electrode side electrode is welded to the connection part 4a of the current collector 4 in a bundled state. The uncoated region 3b of the negative electrode side electrode is welded to the connection part 6a of the current collector 6 in a bundled state. In this manner, the current collectors 4 and 6 support the electrode assembly 3.

As described above, the terminal bolt 5 on the positive electrode side is attached to the lid part 2 formed of metal (specifically, aluminum). Therefore, the terminal bolt 5 on the positive electrode side is electrically connected to the current collector 4 on the positive electrode side. Similarly, the terminal bolt 7 on the negative electrode side is electrically connected to the current collector 6 on the negative electrode side.

The current collector 4 on the positive electrode side is electrically connected to the terminal bolt 5 via a rivet 8. The rivet 8 is integrally formed on a head of the terminal bolt 5. The rivet 8 penetrates through the current collector 4, a lower gasket 12, the lid part 2, and an upper gasket 11. In this state, the rivet 8 is caulked at an inner end of the housing BC. This allows the current collector 4 to be fixed to the lid part 2. The lower gasket 12 electrically insulates the lid part 2 from the current collector 4 and the rivet 8. The upper gasket 11 electrically insulates the lid part 2 from the terminal bolt 5 including the rivet 8.

The vicinity of the rivet on the negative electrode side has a similar configuration. That is, the current collector 6 on the negative electrode side is electrically connected to the terminal bolt 7 via a rivet 15. The rivet 15 is integrally formed on a head of the terminal bolt 7. The rivet 15 penetrates through the current collector 6, a lower gasket 18, the lid part 2, and an upper gasket 17. In this state, the rivet 15 is caulked at an inner end of the housing BC. This allows the current collector 6 to be fixed to the lid part 2. The lower gasket 18 electrically insulates the lid part 2 from the current collector 6 and the rivet 15. The upper gasket 17 electrically insulates the lid part 2 from the terminal bolt 7 including the rivet 15. Each of the upper gaskets 11 and 17 and the lower gaskets 12 and 18 also serves as an airtight seal between the lid part 2 and the rivets 8 and 15 that penetrate through the lid part 2.

[Process of Manufacturing Nonaqueous Electrolyte Secondary Battery RB]

Next, a process of manufacturing a secondary battery RB with the above configuration, especially a process of manufacturing an electrode plate of the electrode assembly 3 is described.

[Process of Manufacturing Positive Electrode Side Electrode]

First, a process of manufacturing the positive electrode side electrode of the electrode assembly 3 is described.

The process of manufacturing the positive electrode side electrode includes application of the positive electrode active material on the positive electrode plate. In this embodiment, an aluminum foil with excellent oxidation resistance is used as the positive electrode plate. In other words, the positive electrode plate is in a foil form. In this embodiment, this aluminum foil is formed in a rectangular band form with the width of 160 mm. The aluminum foil may have the thickness of 12 μm to 25 μm, and preferably has the thickness of 15 μm. As a material alternative to the aluminum foil that can be used for the positive electrode plate, a foil of metal such as titanium, stainless steel, and nickel, or of conductive polymer can be used. Any of these metals may contain a small amount of another metal component or may be an alloy containing plural metal components.

The positive electrode active material applied on the positive electrode plate is lithium iron phosphate ($LiFePO_4$) in this embodiment. Moreover, the conductive layer (undercoat layer) is applied between the positive electrode plate and the active material layer on the positive electrode side. The conductive layer increases the bond strength of the active material layer on the positive electrode side. This provides an effect of reducing the contact resistance, for example. The conductive layer and the active material layer on the positive electrode side are sequentially stacked on the positive electrode plate.

In this embodiment, the coating agent for forming this conductive layer is in a slurry form and is obtained by mixing 10 wt. % of acetylene black, 4.5 wt. % of glyceryl chitosan, 4.5 wt. % of pyromellitic acid, and 81 wt. % of NMP (N-methyl-2-pyrrolidone). This coating agent is applied on both front and back surfaces of the positive electrode plate.

Figure 2A:
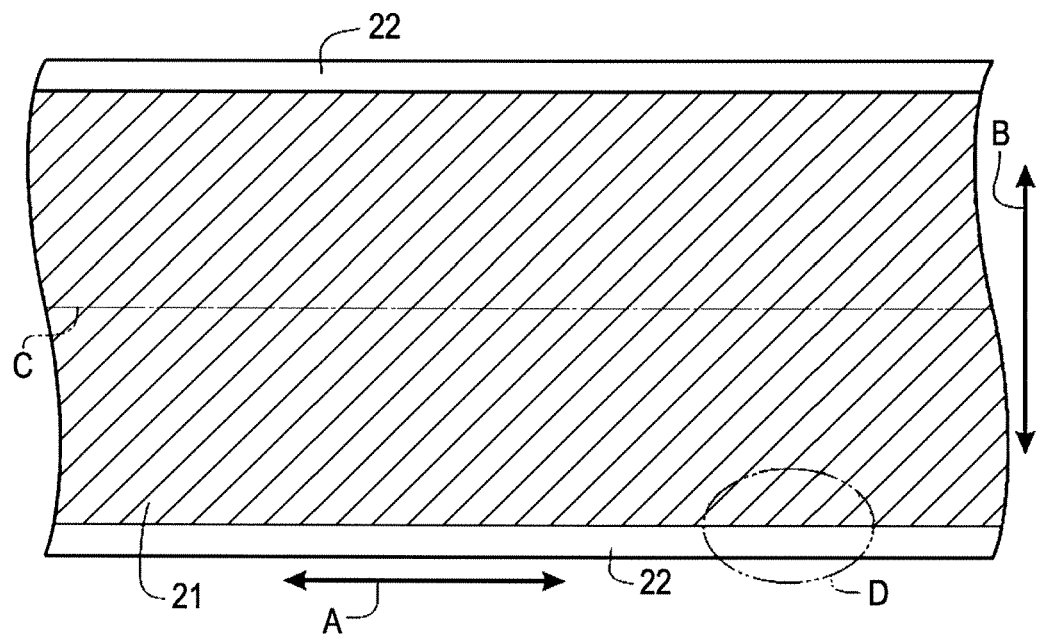
FIGS. 2A and 2B depict a process of manufacturing an electrode foil according to the embodiment of the present disclosure.

FIG. 2A is a plan view illustrating an electrode plate (aluminum foil) 22 on the positive electrode side on which a conductive layer 21 is formed.

In FIG. 2A, an arrow B indicates the width direction of the electrode plate 22 on the positive electrode side in a rectangular band form. An area serving as the uncoated region 3*a* is formed at each end in the width direction. The conductive layer 21 is formed in a band form extending in the longitudinal direction (direction indicated by an arrow A in FIG. 2A) in a region of the electrode plate 22 on the positive electrode side except for the area where the uncoated region 3*a* is formed (central region in the width direction). The width of the portion where the conductive layer 21 is not formed at each end in the width reaction (the length of the electrode plate 22 on the positive electrode side in the width direction) is 10 mm each in this embodiment.

Figure 2B:
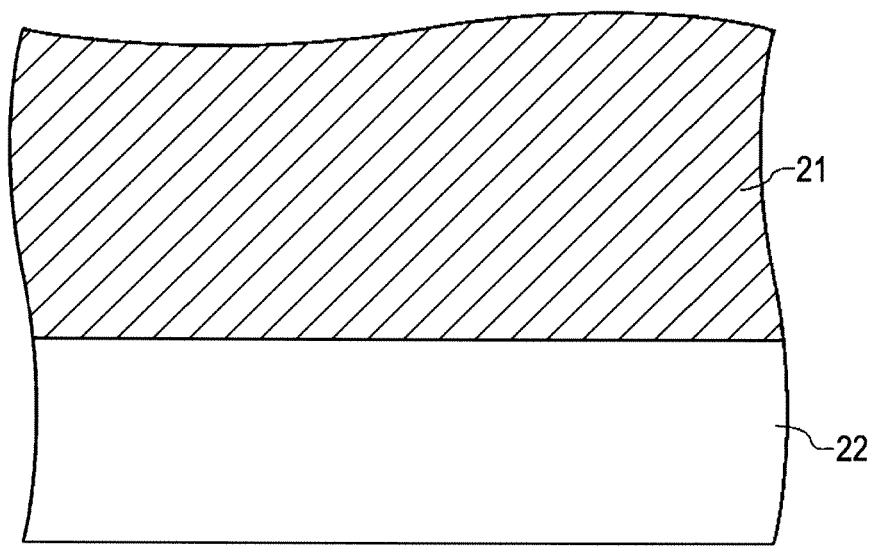

Note that FIG. 2B is used for comparison with a state after processing in a later step. This figure is a magnified view illustrating a portion surrounded by a two-dot chain line D in FIG. 2A.

The electrode plate 22 on the positive electrode side is in a rectangular band form. The electrode plate 22 on the positive electrode side in a state of being rolled up in a roll form is transported in the longitudinal direction (direction indicated by the arrow A in FIG. 2A) of the electrode plate 22 on the positive electrode side. On the electrode plate 22 on the positive electrode side that is transported, the conductive layer 21 is applied through gravure coating. The thickness of the application of the conductive layer 21 is set so that the conductive layer 21 after being dried has the thickness of 1 μm to 2 μm in this embodiment.

In this embodiment, two positive electrode side electrodes are formed at the same time. The length of the electrode plate 22 on the positive electrode side in the width direction (direction indicated by the arrow B in FIG. 2A) is twice the width of the positive electrode side electrode. In the final step of manufacturing the positive electrode side electrode, the electrode plate 22 on the positive electrode side is cut at a central position in the width direction indicated by a dot-dash-line C in FIG. 2A. Thus, the two positive electrode side electrodes are manufactured.

The position where the conductive layer 21 is applied is controlled as follows. The edge position of the electrode plate 22 on the positive electrode side in the width direction (direction indicated by the arrow B) is optically detected. Based on the positional information, the position where the conductive layer 21 is applied is controlled with high accuracy so that the central position of the electrode plate 22 on the positive electrode side in the width direction coincides with the central position of the width of the application of the conductive layer 21. The conductive layer 21 is dried after the application.

The application step for the conductive layer 21 is performed also on the opposite surface of the electrode plate 22 on the positive electrode side.

After the conductive layer 21 is applied and then dried, an active material layer and a short-circuiting prevention layer are further applied on the conductive layer 21.

In this embodiment, lithium iron phosphate ($LiFePO_4$) is used as the positive electrode active material as described above.

The short-circuiting prevention layer is formed by being applied on a portion that faces a negative electrode active material layer of the negative electrode side electrode out of a portion of the positive electrode side electrode where the positive electrode active material is not applied in a state of being assembled as a part of the electrode assembly 3. That is to say, the short-circuiting prevention layer is to prevent the uncoated region 3*a* of the positive electrode side electrode and the negative electrode side electrode from facing directly each other. The provision of the short-circuiting prevention layer can suppress or prevent the heat generation and the like due to the contact between the positive electrode plate and the negative electrode active material layer even in the occurrence of separator breakage due to the intrusion of foreign matter or the like.

This short-circuiting prevention layer may be applied after the active material layer on the positive electrode side is applied. The application of the active material layer on the positive electrode side and the application of the short-circuiting prevention layer may be performed successively.

In this case, the short-circuiting prevention layer is applied before the active material layer on the positive electrode side is dried. This can increase the separation strength of the short-circuiting prevention layer.

The application of the active material layer on the positive electrode side is described.

The active material layer on the positive electrode side includes a mixture of 87 wt. % of micropowder of LiFePO$_4$, 5 wt. % of acetylene black serving as a conduction auxiliary agent, and 8 wt. % of polyvinylidene fluoride (PVDF) serving as a binding agent. By addition of NMP (N-methyl-2-pyrrolidone) into this mixture, a positive electrode mixture paste in a paste form is formed. This paste is applied to both front and back surfaces of the electrode plate 22 on the positive electrode side on which the conductive layer 21 is applied. Thus, a multilayer structure including the conductive layer 21 and the electrode plate 22 on the positive electrode side is formed.

Note that the microparticles of LiFePO$_4$ used each have the diameter D50 (median diameter) of 20 μm. All the LiFePO$_4$ particles are covered with a carbon coat layer with the thickness of approximately 1 nm. The particle diameter of the LiFePO$_4$ particle includes the thickness of the carbon coat layer.

The above application step is similar to the application step for the conductive layer 21. The electrode plate 22 on the positive electrode side on which the conductive layer 21 is formed is transported in the longitudinal direction. On the conductive layer 21 on the electrode plate 22 on the positive electrode side that is transported, the paste is applied through die coating. Thus, an active material layer 23 on the positive electrode side in a band form extending in the longitudinal direction of the electrode plate 22 on the positive electrode side is formed (see FIG. 3A).

Figure 3A:
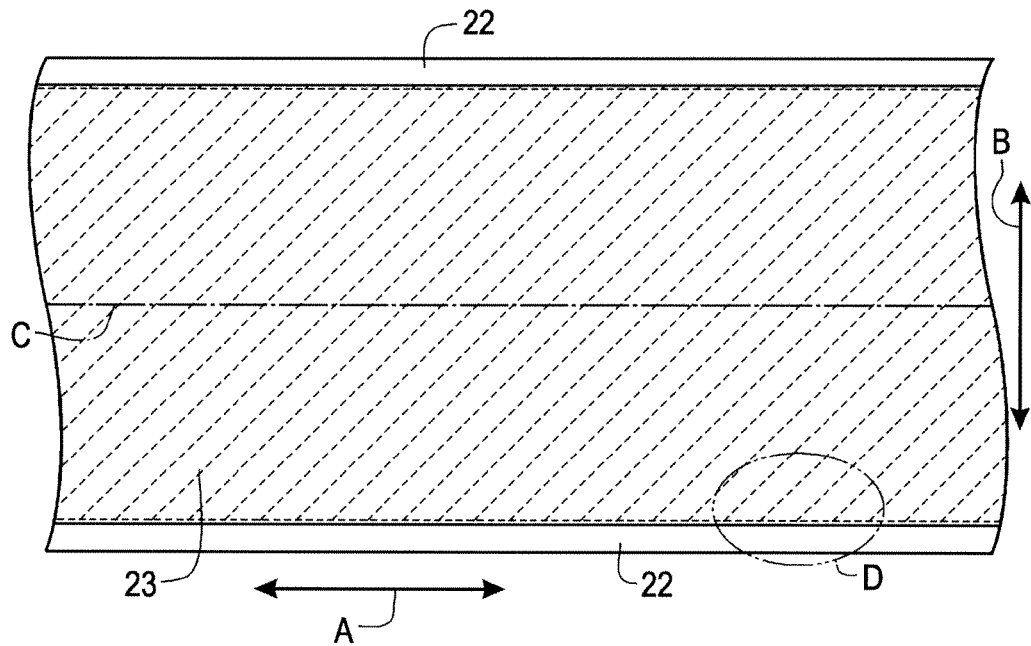
FIGS. 3A and 3B depict the process of manufacturing the electrode foil according to the embodiment of the present disclosure.

The active material layer 23 on the positive electrode side is, as depicted in FIG. 3A, applied in a band form extending in the longitudinal direction (direction indicated by an arrow A in FIG. 3A) of the electrode plate 22 on the positive electrode side. The thickness of the application of the active material layer 23 on the positive electrode side may be 40 μm to 130 μm. In this embodiment, the thickness of the application is 130 μm.

The position where the active material layer 23 on the positive electrode side is applied is controlled as follows. That is, the edge position of the electrode plate 22 on the positive electrode side in the width direction (direction indicated by an arrow B in FIG. 3A) or the edge position of the conductive layer 21 in the width direction is optically detected. Based on the positional information, the position where the active material layer 23 on the positive electrode side is applied is controlled with high accuracy so that the central position of the electrode plate 22 on the positive electrode side or the conductive layer 21 in the width direction coincides with the central position of the width of the application of the active material layer 23 on the positive electrode side.

The width of the application of the active material layer 23 on the positive electrode side (width of the application in the direction indicated by the arrow B in FIG. 3A) is set so that the exposure region of the electrode plate 22 on the positive electrode side serving as the uncoated region 3a is located at each end of the electrode plate 22 on the positive electrode side in the width direction. Furthermore, this width of the application is set so that the active material layer 23 on the positive electrode side completely covers the conductive layer 21.

Figure 3B:
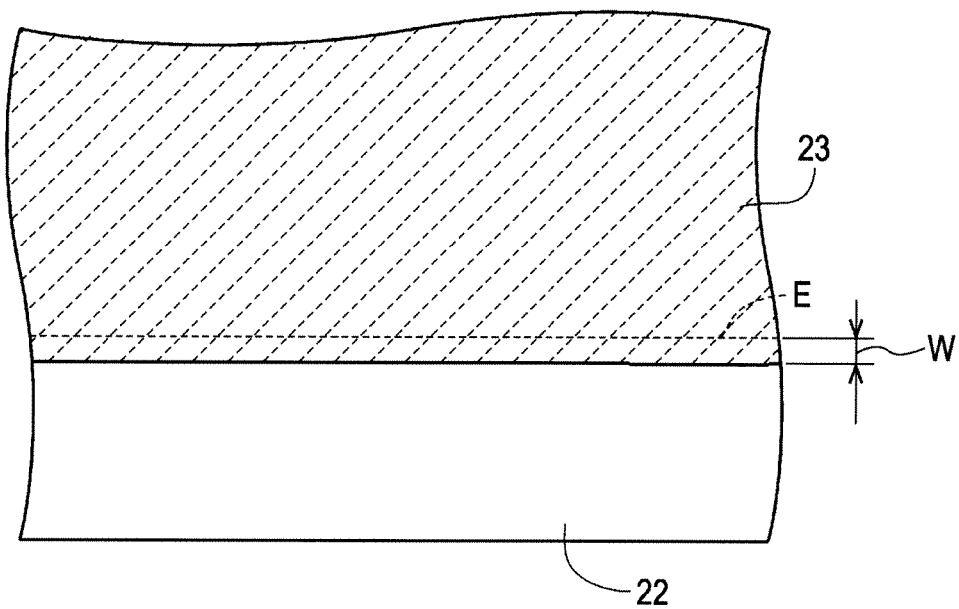

FIG. 3B is a magnified view illustrating the vicinity of the region surrounded by the two-dot chain line D in FIG. 3A. FIG. 3B corresponds to FIG. 2B.

The edge of the conductive layer 21 in FIG. 2B is depicted with a dashed line E in FIG. 3B. The edge of the active material layer 23 on the positive electrode side on the upper layer side in the width direction (direction indicated by the arrow B) is located closer to the region where the electrode plate 22 on the positive electrode side is exposed, which serves as the uncoated region 3a, than the edge of the conductive layer 21 on the lower layer side depicted with the dashed line E. Therefore, the active material layer 23 on the positive electrode side spreads beyond the conductive layer 21. That is, the active material layer 23 on the positive electrode side is formed continuously on the positive electrode plate and on the conductive layer.

For the convenience of the description, the part of the active material layer 23 on the positive electrode side that spreads beyond the position of the conductive layer 21 to the side of the exposure region of the electrode plate 22 on the positive electrode side is sometimes referred to as "active material layer spreading part".

In this embodiment, the active material layer spreading part is formed over the entire length of the range where the conductive layer 21 and the active material layer 23 on the positive electrode side are applied. The active material layer spreading part is formed in the range along substantially the entire length of the boundary portion between the uncoated region and the active material layer on the positive electrode side.

The distance W (see FIG. 3B) between the edge position of the conductive layer 21 (position indicated by the dashed line E) and the edge position of the active material layer 23 on the positive electrode side in the width direction (direction indicated by the arrow B) of the electrode plate 22 on the positive electrode side is 2 mm or less. The width of the application of the active material layer 23 on the positive electrode side is set so as to achieve this.

Subsequent to the application of the active material layer 23 on the positive electrode side, the short-circuiting prevention layer is applied through the same transportation passage.

The short-circuiting prevention layer includes a mixture of a binding agent and a microparticle of an electrically insulating member. This mixture is in a paste form by being mixed with an appropriate liquid. This paste is applied to both front and back surfaces of the electrode plate 22 on the positive electrode side on which the active material layer 23 on the positive electrode side is applied.

The microparticle of the electrically insulating member includes, for example, an inorganic particle of Al$_2$O$_3$, SiO$_2$, ZrO$_2$, TiO$_2$, MgO, or the like, and an organic particle of polyimide powder or the like. Among these, the microparticle is preferably Al$_2$O$_3$ because the stability is high and Al$_2$O$_3$ is easily handled, for example. In particular, the microparticle is preferably a γ-type alumina particle because the adhesion and the bonding strength with the positive electrode plate can be increased, for example.

The microparticle may have a particle diameter (center value of primary particle diameter) of 1 nm to 2000 nm. In order to increase the adhesion and the bonding strength with the positive electrode plate, the particle diameter is preferably 1 nm to 200 nm, and more preferably 1 nm to 20 nm.

The binding agent mixed into the microparticle of the electrically insulating member includes polyvinylidene fluoride (PVDF), polyimide, polyamide imide, or the like. For increasing the adhesion and the bonding strength with the positive electrode plate, this binding agent is preferably PVDF.

In this embodiment, γ-type alumina particles (2.1 kg) each with the particle diameter of 5 nm, the specific surface area of 96 m$^2$/g, and the tap density of 0.04 g/cm$^3$ are mixed in a liquid obtained by dissolving an NMP solution (21.39 kg) containing 12% of PVDF as a binding agent (the amount of PVDF is 2.567 kg) into NMP (6.0 kg). By dispersing the alumina particles uniformly in this liquid, a short-circuiting prevention paste in a slurry form is formed.

The material of a short-circuiting prevention layer 24 is not necessarily the electrically insulating material as described above but is preferably the one having sufficiently high electrical resistance. This material preferably has higher electrical resistance than the electrode plate 22 on the positive electrode side.

Figure 4A:
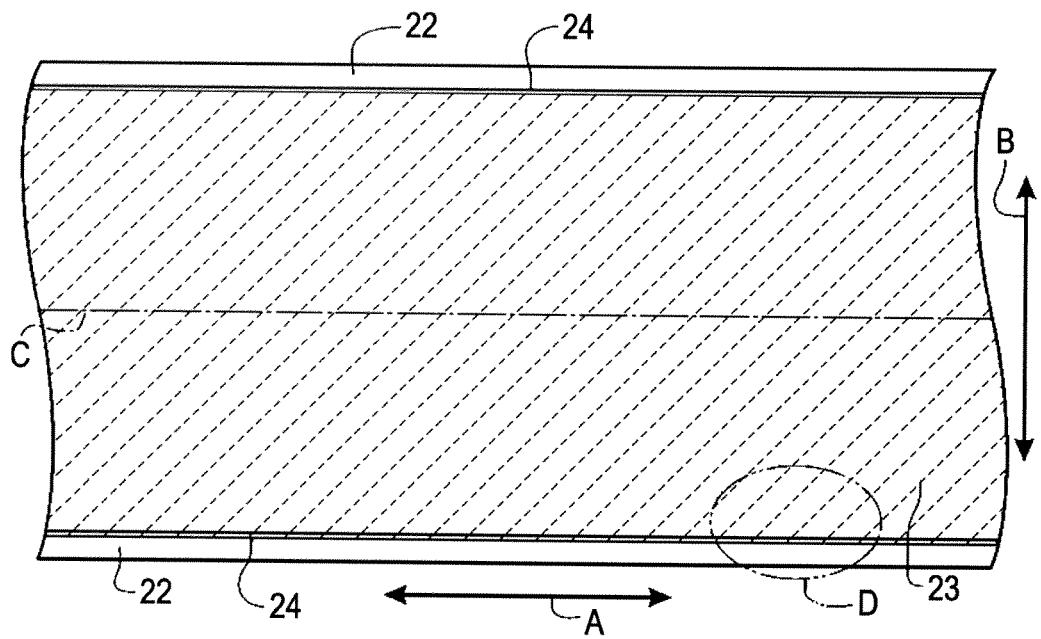
FIGS. 4A and 4B depict the process of manufacturing the electrode foil according to the embodiment of the present disclosure.

The application step is similar to the application step for the active material layer 23 on the positive electrode side, and the like. The short-circuiting prevention layer 24 is applied through die coating on the electrode plate 22 on the positive electrode side which is transported in a state that the active material layer 23 on the positive electrode side and the like are applied. This brings the short-circuiting prevention layer 24 into a state depicted in FIG. 4A.

Figure 4B:
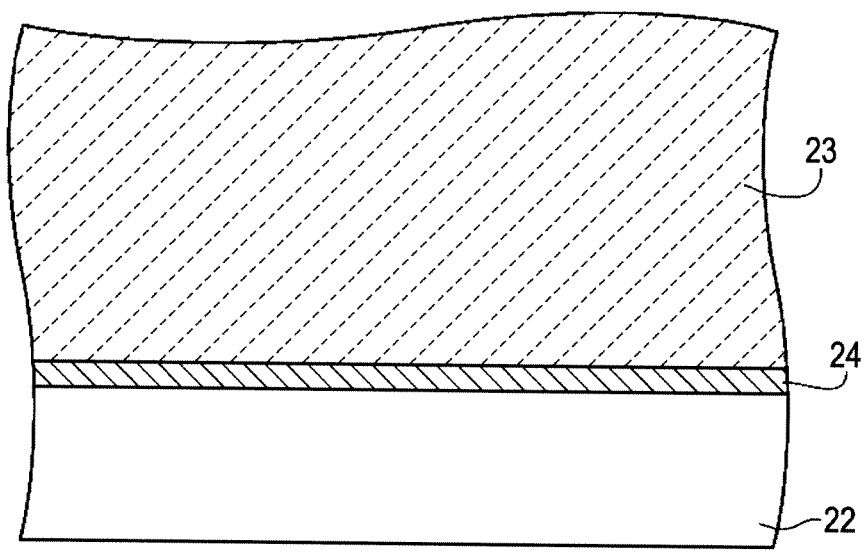

FIG. 4B corresponds to FIG. 2B and FIG. 3B. This figure is a magnified view illustrating the vicinity of the region indicated with a two-dot chain line D in FIG. 4A.

The application of the short-circuiting prevention layer 24 is performed at the positions of the both ends of the active material layer 23 on the positive electrode side in the width direction (direction indicated by an arrow B in FIG. 4A) of the electrode plate 22 on the positive electrode side. The short-circuiting prevention layer 24 has the predetermined width that allows overlapping with the edge of the active material layer 23 on the positive electrode side and the exposure part of the electrode plate 22 on the positive electrode side. The short-circuiting prevention layer 24 is applied in a band form extending in the longitudinal direction (direction indicated by an arrow A in FIG. 4A) of the electrode plate 22 on the positive electrode side.

FIG. 1 depicts the vicinity of the boundary between the active material layer 23 on the positive electrode side and the short-circuiting prevention layer 24. FIG. 1 is a magnified sectional view in which the electrode plate 22 on the positive electrode side is viewed from the longitudinal direction. As depicted in FIG. 1, the short-circuiting prevention layer 24 is formed on the boundary portion between the active material layer 23 on the positive electrode side and the uncoated region 3a. The short-circuiting prevention layer 24 is applied so as to spread over the inclined part in the vicinity of the edge of the active material layer 23 on the positive electrode side and over the exposure region of the electrode plate 22 on the positive electrode side. The thickness of the application of the short-circuiting prevention layer 24 may be 3 µm to 15 µm. It is preferable that the short-circuiting prevention layer 24 be not higher (thicker) than the active material layer 23 on the positive electrode side.

In this manner, the short-circuiting prevention layer 24 is applied to the exposure region of the electrode plate 22 on the positive electrode side and the inclined part in the vicinity of the edge of the active material layer 23 on the positive electrode side. This can increase the bonding strength between the short-circuiting prevention layer 24 and the active material layer 23 on the positive electrode side. Furthermore, the short-circuiting prevention layer 24 is lower than the active material layer 23 on the positive electrode side because of the following reasons. The short-circuiting prevention layer 24 includes a large amount of binding agent for surely binding microparticles of metal oxide. Therefore, once the short-circuiting prevention layer 24 is applied onto the active material layer 23 on the positive electrode side, it is difficult for the short-circuiting prevention layer 24 to separate off from a pressing roll in later-described press processing. Note that in FIG. 1, the short-circuiting prevention layer 24 and the active material layer 23 on the positive electrode side are applied to both front and back surfaces of the electrode plate 22 on the positive electrode side. The layers depicted in FIG. 1 do not necessarily have the thicknesses in the correct ratio.

The width of the application of the short-circuiting prevention layer 24 corresponds to the width of the electrode plate 22 on the positive electrode side in the width direction (direction indicated by an arrow B in FIG. 1, etc.). This width is set so that the short-circuiting prevention layer 24 covers a predetermined region. This predetermined region refers to a region of the positive electrode side electrode that faces the part of the negative electrode side electrode on which the negative electrode active material layer has been applied when the positive electrode side electrode and the negative electrode side electrode are wound, and that is not provided with the active material layer 23 on the positive electrode side.

That is, the width of the application of the negative electrode active material layer of the negative electrode side electrode is slightly larger than that of the active material layer 23 on the positive electrode side described above. The short-circuiting prevention layer 24 fills the difference between the width of the application of the active material layer 23 on the positive electrode side and the width of the application of the negative electrode active material layer.

The position where the short-circuiting prevention layer 24 is applied is controlled as follows. The edge position of the active material layer 23 on the positive electrode side in the width direction of the electrode plate 22 on the positive electrode side is detected with the optical position detection unit including an optical sensor, such as an imaging device. Based on the detection information, the position of the active material layer 23 on the positive electrode side is specified. The edge position of the short-circuiting prevention layer 24 is controlled with high accuracy so that the edge overlaps with the inclined part of the edge of the active material layer 23 on the positive electrode side (see FIG. 1).

This optical position detection unit (for example, imaging device) may take the image in the vicinity of the edge position of the active material layer 23 on the positive electrode side. From the taken image, the information on the color change in the width direction of the electrode plate 22 on the positive electrode side is acquired. This information may be used for specifying the edge position of the active material layer 23 on the positive electrode side.

Based on the thusly detected information on the edge position of the active material layer 23 on the positive electrode side, the position where the short-circuiting prevention layer 24 is applied in the width direction of the electrode plate 22 on the positive electrode side or the position of the transportation of the electrode plate 22 on the positive electrode side is controlled. Thus, the short-circuiting prevention layer 24 can be applied with high accuracy.

The position of the formation of the short-circuiting prevention layer 24 is controlled in the manner described above. Thus, the optical position detection unit successively detects the edge position of the active material layer 23 on the positive electrode side over the entire length of the application of the short-circuiting prevention layer 24. As described above, the range over substantially the entire length of the boundary portion between the uncoated region 3a and the active material layer 23 on the positive electrode side is set as the active material layer spreading part.

As described above, the short-circuiting prevention layer 24 and the active material layer 23 on the positive electrode side are applied on the electrode plate 22 on the positive electrode side. After that, these are dried. Furthermore, the short-circuiting prevention layer 24 and the active material layer 23 on the positive electrode side are applied on the opposite surface of the electrode plate 22 on the positive electrode side through a process similar to the above, and dried.

Through the above process, the conductive layer 21, the active material layer 23 on the positive electrode side, and the short-circuiting prevention layer 24 are formed on the both front and back surfaces of the electrode plate 22 on the positive electrode side. After that, press processing is performed.

This press processing includes press processing for suppressing curvature of the positive electrode side electrode and press processing for, for example, increasing the density of the active material layer 23 on the positive electrode side. The electrode plate 22 on the positive electrode side to be transported (the one on which the active material layer 23 on the positive electrode side and the like are applied) is sequentially subjected to these two kinds of press processing.

Figure 6:
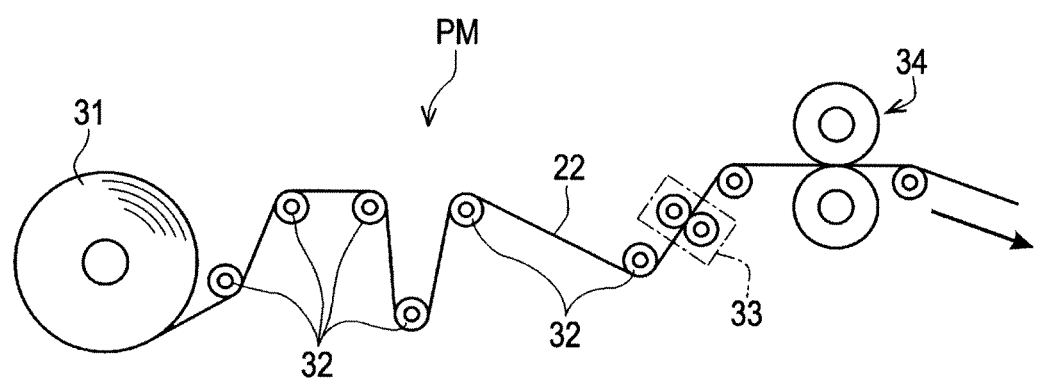
FIG. 6 is a schematic explanatory view of a press processing step performed on the electrode foil according to the embodiment of the present disclosure.

The press processing is performed with a press processing device PM that is schematically depicted in FIG. 6.

The press processing device PM includes a transportation system 32, an intermittent roll pressing device 33, and a main roll pressing device 34. The transportation system 32 extracts the electrode plate 22 on the positive electrode side from a roll 31 of the electrode plate 22 on the positive electrode side on which the active material layer 23 on the positive electrode side and the like are applied. The transportation system 32 transports the electrode plate 22 on the positive electrode side while a predetermined tension is added thereto. The intermittent roll pressing device 33 extends the exposure part at the both ends of the electrode plate 22 on the positive electrode side in the width direction. The main roll pressing device 34 extends the entire region where the active material layer 23 on the positive electrode side is applied.

Figure 7:
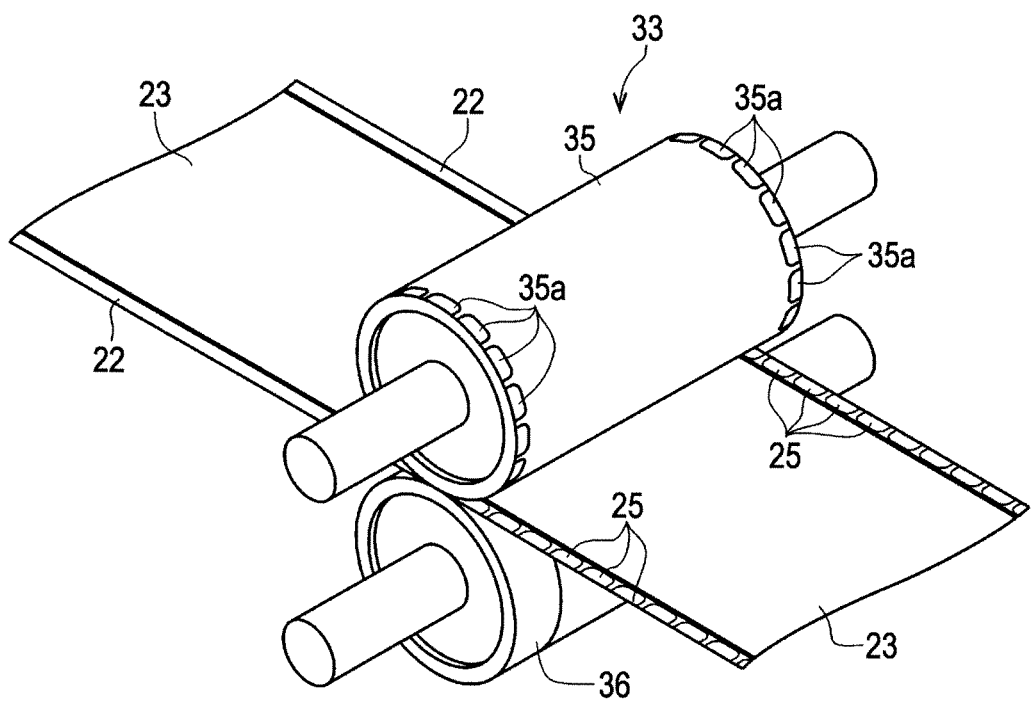
FIG. 7 depicts press processing performed on the electrode foil according to the embodiment of the present disclosure.

The intermittent roll pressing device 33 is schematically depicted in the perspective view of FIG. 7. As depicted in this figure, the intermittent roll pressing device 33 includes a transportation passage for the electrode plate 22 on the positive electrode side and a pair of pressing rollers 35 and 36 having the transportation passage interposed therebetween. The pair of pressing rollers 35 and 36 is driven by a motor which is not depicted.

The pressing roller 35 includes protrusions 35a in both end parts of the periphery thereof in the width direction. Each of the protrusions 35a has a small step and protrudes in a plateau shape. The protrusions 35a are arranged in the circumferential direction at predetermined intervals.

The protrusions 35a are formed in a substantially rectangular form when seen from the normal line direction of the peripheral surface of the pressing roller 35. More specifically, the shape of the surface of the protrusion 35a is a rectangle, inner of which corners are rounded.

The protrusions 35a of the pressing roller 35 are located at positions corresponding to the both ends in the width direction of the electrode plate 22 on the positive electrode side. The protrusions 35a press only the exposure part of the electrode plate 22 on the positive electrode side at the both ends in the width direction.

As a result, the uncoated part (exposure part) of the electrode plate 22 on the positive electrode side is pressed and extended in advance by the protrusions 35a of the pressing roller 35. Thus, the curvature of the positive electrode side electrode is suppressed. This is described later more specifically.

The specific size of each part of the intermittent roll pressing device 33 is described. The pressing roller 35 is a circular cylindrical roller with the diameter of 118 mm. Each of the protrusions 35a has the height of 1 mm.

The interval (pitch) of the protrusions 35a in the circumferential direction of the pressing roller 35 may be set in the range of 15 mm to 50 mm. This provides a desired extension effect. By setting this pitch at approximately 30 mm, a particularly excellent result can be obtained.

The pair of pressing rollers 35 and 36 presses a transported object by applying a predetermined amount of pressure on the object. This pressure (linear pressure) is set at 100 kgf/cm$^2$ or more in this embodiment.

The main roll pressing device 34 is a roller for pressing with the diameter of 300 mm in this embodiment. The main roll pressing device 34 presses, with a linear pressure of 200 kgf/cm$^2$, the portion where the active material layer 23 on the positive electrode side is formed by application.

Description is made of the relationship between the linear pressure applied by the intermittent roll pressing device 33 and the linear pressure applied by the main roll pressing device 34. The linear pressure applied by the intermittent roll pressing device 33 may be set to be at least 30% of the linear pressure applied by the main roll pressing device 34. This can suppress the occurrence of curvature.

In this embodiment the transportation system 32, the intermittent roll pressing device 33, and the main roll pressing device 34 transport, at the speed of 20 m per minute, the electrode plate 22 on the positive electrode side on which the active material layer 23 on the positive electrode side and the like are formed by application.

The tension applied on the electrode plate 22 on the positive electrode side by the transportation system 32 may be approximately 10 N to 60 N, and is preferably 20 N to 30 N.

The electrode plate 22 on the positive electrode side on which the active material layer 23 on the positive electrode side and the like are formed by application is extracted from the roll 31. Then, the electrode plate 22 on the positive electrode side is transmitted through the intermittent roll pressing device 33 and the main roll pressing device 34, by which the electrode plate 22 is subjected to press processing. Thus, as depicted in the plan view of FIG. 5, pressure marks 25 are formed that correspond to the protrusions 35a of the pressing roller 35. In this embodiment, the 130-μm-thick active material layer 23 on the positive electrode side is reduced in thickness down to 80 μm on one side after the press processing. Moreover, the pressure marks 25 that have been extended by being rolled to the thickness of 95% of the original thickness is formed on the portion of the uncoated part of the active material layer 23 on the positive electrode side that has been pressed by the intermittent roll pressing device 33.

The distance in the width direction of the electrode plate 22 on the positive electrode side (distance indicated by "F" in FIG. 5) between the edge of the active material layer 23 on the positive electrode side on the uncoated region 3a (exposure part of the electrode plate 22 on the positive electrode side) side and the edge of the portion pressed by the protrusions 35a of the pressing roller 35 on the side of the active material layer 23 on the positive electrode side is set at 4 mm or less.

Alternatively, the intermittent roll pressing device 33 may not be used. In this case, the main roll pressing device 34 is used to press the part of the electrode plate 22 on the positive electrode side where the active material layer 23 on the positive electrode side is formed by application. In this case, the part where the active material layer 23 on the positive electrode side is formed by application, to which high pressure is applied, extends in the longitudinal direction. Meanwhile, the exposure part of the electrode plate 22 on the positive electrode side does not receive that high pressure. Therefore, the extension of this part in the longitudinal direction is small.

A specific example thereof is described. It is assumed that the part where the active material layer 23 on the positive electrode side is formed by application extends in the longitudinal direction by 0.346% before and after the press processing. On this occasion, the exposure part of the electrode plate 22 on the positive electrode side is to extend in the longitudinal direction by 0.031% before and after the press processing. That is, the degree of extension is different by 10 times or more.

Figure 5:
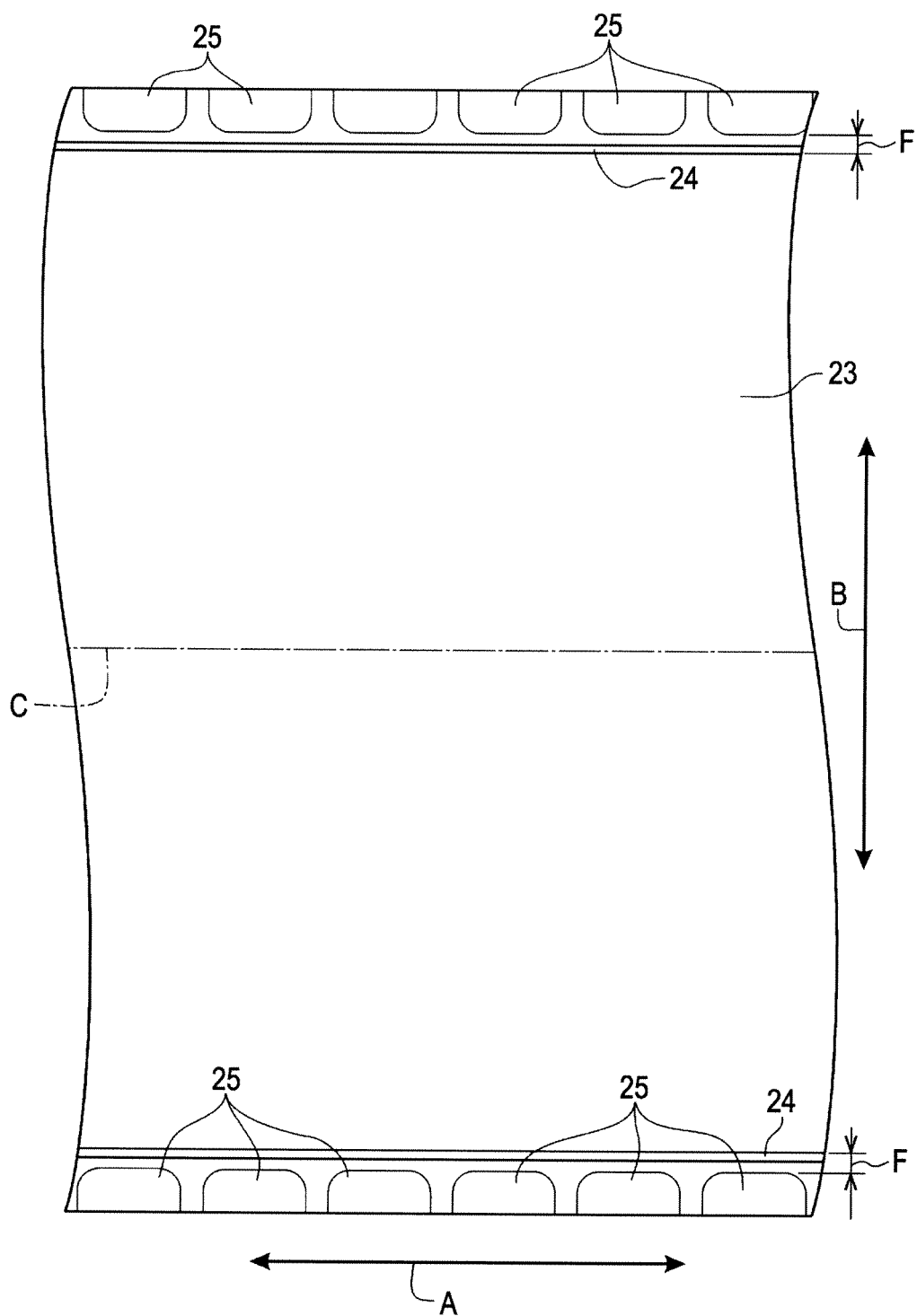
FIG. 5 depicts the process of manufacturing the electrode foil according to the embodiment of the present disclosure.

No countermeasure may be taken against this difference in extension; in this case, the electrode plate 22 on the positive electrode side on which the active material layer 23 on the positive electrode side and the like are formed by application can be cut at the position indicated by a dot-and-dash line C in FIG. 5 after the press processing. On this occasion, the side on which the active material layer 23 on the positive electrode side is applied is curved (becomes convex).

In contrast to this, the exposure part of the electrode plate 22 on the positive electrode side can be extended by press processing with the intermittent roll pressing device 33 as described above. In this case, the extension in the longitudinal direction of the portion where the active material layer 23 on the positive electrode side is formed by application becomes substantially equal to (becomes well balanced with) the extension in the longitudinal direction of the exposure part of the electrode plate 22 on the positive electrode side. Accordingly, in the case where the electrode plate 22 on the positive electrode side is cut at the position indicated by the dot-and-dash line C in FIG. 5, the curvature is sufficiently suppressed.

The distance indicated by "F" in FIG. 5 is preferably 4 mm or less in order to make the extension states of the uncoated region 3a and the region where the active material layer 23 on the positive electrode side is formed equal to each other. This distance corresponds to the distance in the width direction of the electrode plate 22 on the positive electrode side between the edge of the active material layer 23 on the positive electrode side on the uncoated region 3a (exposure part of the electrode plate 22 on the positive electrode side) side and the edge of the portion pressed by the protrusions 35a of the pressing roller 35 on the side of the active material layer 23 on the positive electrode side. When this distance is more than 4 mm, the uncoated region 3a that is extended in the step of pressing the uncoated region and the region where the active material layer 23 on the positive electrode side is formed that is extended are no longer well-balanced. This might cause the positive electrode side electrode to remain bent (curved) after all.

In the case where the region where the active material layer 23 on the positive electrode side is formed is smaller than the region where the conductive layer 21 is formed, the conductive layer 21 might be exposed. In such a case, the uncoated region 3a except for the exposure part of the conductive layer 21 is pressed, and on this occasion, it is difficult to set the distance "F" at 4 mm or less.

In this manner, the press processing is completed. Next, the electrode plate 22 on the positive electrode side on which the active material layer 23 on the positive electrode side is applied is cut in the longitudinal direction.

The cutting is performed at the position indicated by the dot-and-dash line C in FIG. 5. The cutting at this position provides the two positive electrode side electrodes that have almost the same shape.

Through this cutting process, in a manner similar to the case of using the device depicted in FIG. 6, the electrode plate 22 on the positive electrode side after the press processing (the one on which the active material layer 23 on the positive electrode side and the like are applied) is transported. For example, a cutter blade is placed to the position indicated by the dot-and-dash line C on the electrode plate 22 on the positive electrode side that is transported. This enables the cutting.

The position of the dot-and-dash line C corresponds to the center in the width direction of the range where the active material layer 23 on the positive electrode side is applied. In the setting of the cutting position by a cutter or the like, the edge positions at the both ends in the width direction of the active material layer 23 on the positive electrode side in the width direction of the electrode plate 22 on the positive electrode side are detected with the optical position detection unit including the optical sensor, such as an imaging device. Based on the detection information, the cutting position is controlled so that the center between the both edge positions is cut.

In a manner similar to the application of the short-circuiting prevention layer 24, the image in the vicinity of the edge position of the active material layer 23 on the positive electrode side may be taken with this optical position detection unit (such as an imaging device). From the taken image, the information on the color change of the electrode plate 22 on the positive electrode side in the width direction is acquired. The edge position of the active material layer 23 on the positive electrode side may be specified based on this information.

In this manner, the information on the edge position of the active material layer 23 on the positive electrode side is detected. Based on this information, the position of a cutter or the like, or the position to which the electrode plate 22 on the positive electrode side is transported is controlled in the width direction of the electrode plate 22 on the positive electrode side. This allows for accurate cutting of the electrode plate 22 on the positive electrode side on which the active material layer 23 on the positive electrode side is applied. Of course, one edge position of the active material layer 23 on the positive electrode side in the width direction may be optically detected. In this case, the position away from the detection position by ½ of the width of the application of the active material layer 23 on the positive electrode side may be specified as the cutting position.

The cutting position of the electrode plate 22 on the positive electrode side is controlled as described above. Therefore, the edge position of the active material layer 23 on the positive electrode side is successively detected over the entire length of the electrode plate 22 on the positive electrode side with the optical position detection unit. In this manner, the range over substantially the entire length of the boundary portion between the uncoated region 3a and the active material layer 23 on the positive electrode side is set as the active material layer spreading part.

[Process of Manufacturing Negative Electrode Side Electrode]

Next, a process of manufacturing a negative electrode side electrode of the electrode assembly 3 is described.

In a manner similar to the positive electrode side electrode, two negative electrode side electrodes are also manufactured at the same time. Before the final step of the process of manufacturing the negative electrode side electrode, two negative electrode plates are arranged in line in the width direction. In the final step, these electrode plates are cut at the central position in the width direction. Thus, the two negative electrode side electrodes are obtained.

The negative electrode side electrode is manufactured by applying a negative electrode active material on the negative electrode plate as described above. In this embodiment, the material of the negative electrode plate is a copper foil. A copper foil is stable in reduction and has excellent conductivity. That is, the negative electrode plate is in a foil form. This copper foil is formed in a rectangular band form with the width of 170 mm. The negative electrode plate may have the thickness of 7 μm to 15 μm and has the thickness of 10 μm in this embodiment. The material of the negative electrode plate may be copper, nickel, iron, stainless steel, titanium, aluminum, baked carbon, conductive polymer, conductive glass. Al—Cd alloy, or the like. The negative electrode plate may be a foil of copper or the like, the surface of which is treated with carbon, nickel, titanium, silver, or the like. This treatment increases the adhesion property, the conductivity, and the oxidation resistance of the negative electrode plate. Among the above materials, a nickel foil, an iron foil, and an alloy foil including any of those are stable in reduction and have excellent conductivity.

The negative electrode active material applied on the negative electrode plate is graphite in this embodiment. The material of the negative electrode active material may be another material capable of absorbing and releasing Li ions. The material includes, for example, lithium titanate, lithium metal, lithium-contained alloy (such as lithium-aluminum, lithium-lead, lithium-tin, lithium-aluminum-tin, and lithium-gallium), wood's alloy, amorphous carbon, fiber carbon, petroleum pitch based carbon and coke based carbon, which have a spinel type crystal structure.

Moreover, the properties of the carbon material can be improved by addition of metal oxide such as tin oxide and silicon oxide, phosphorus, or boron. Alternatively, graphite may be used in combination with lithium metal, lithium-contained alloy, or the like as the material of the negative electrode active material. Further alternatively, the material of the negative electrode active material may be a carbon material having lithium inserted in advance through electrochemical reduction.

The negative electrode active material includes a mixture including 94 wt. % of graphite and 6 wt. % of PVDF as a binding agent. By addition of NMP to this mixture, a negative electrode mixture paste in a paste form is formed. This paste is applied on both front and back surfaces of the copper foil.

Layers corresponding to the conductive layer 21 and the short-circuiting prevention layer 24 that are formed on the positive electrode side electrode are not formed by application on the negative electrode side electrode in this embodiment. The step of applying the paste is similar to the step of applying the positive electrode active material. That is, the paste is applied through die coating on the copper foil transported in the longitudinal direction.

The negative electrode active material is applied in a band form extending in the longitudinal direction of the copper foil so as to have the thickness of 40 μm to 60 μm. The capacity of the negative electrode is adjusted to be 140 when the positive electrode is assumed to have the capacity of 100.

The position where the negative electrode active material layer is applied is controlled as follows. That is, the edge position of the copper foil in the width direction is optically detected. Based on this positional information, the position where the negative electrode active material layer is applied is controlled with high accuracy so that the center position of the copper foil in the width direction coincides with the central position of the width of the application of the negative electrode active material layer.

Regions each with the width of 10 mm (length of the copper foil in the width direction) located at the both sides of the region where of the negative electrode active material layer is applied each serve as the uncoated region 3b.

The negative electrode active material layer applied on the copper foil is then dried. Furthermore, the negative electrode active material layer is applied and dried on the opposite surface of the copper foil in a process similar to the above.

Through the above steps, the negative electrode active material layer is formed on each of the front and back surfaces of the copper foil. After that, the press processing is performed in a manner similar to the positive electrode side electrode.

The press processing on the negative electrode side electrode is similar to the press processing performed on the positive electrode side electrode. The press processing for suppressing the curvature of the negative electrode side electrode and the press processing for, for example, increasing the density of the negative electrode active material layer are performed.

The device used for performing the press processing on the negative electrode side electrode is similar to the one used for performing the press processing on the positive electrode side electrode. That is, the copper foil on which the negative electrode active material layer is formed by application is transported in the press processing device PM schematically depicted in FIG. 6. This copper foil is sequentially subjected to the press processing for suppressing the curvature of the negative electrode side electrode and the press processing for, for example, increasing the density of the negative electrode active material layer.

In the press processing on the negative electrode side electrode, the intermittent roll pressing device 33 is set to leave pressure marks with the depth of 0.03 μm for the copper foil with the thickness of 10 μm, for example. The main roll pressing device 34 is set to compress the negative electrode active material layer with the thickness of 40 μm to 60 μm to the thickness of 24 μm to 37 μm.

The exposure part of the copper foil of the negative electrode side electrode is also pressed and extended by the intermittent roll pressing device 33. Accordingly, the extension in the longitudinal direction of the portion where the negative electrode active material layer is formed by application due to the pressure from the main roll pressing device 34 becomes substantially equal to the extension in the longitudinal direction of the exposure part of the copper foil. This sufficiently suppresses the curvature of the negative electrode side electrode.

In this manner, the press processing is completed. Next, the copper foil on which the negative electrode active material layer is formed by application is cut in the longitudinal direction.

This step is also similar to the step of cutting the positive electrode side electrode. That is, the copper foil to be transported (on which the negative electrode active material layer is applied) is cut at the central position in the width direction of the range where the negative electrode active material layer is applied. At this cutting, the edge positions at the both ends in the width direction of the negative electrode active material layer may be optically detected. The center between the both edge positions may be cut with a cutter or the like.

[Assembly of Electrode Assembly 3]

Figure 8:
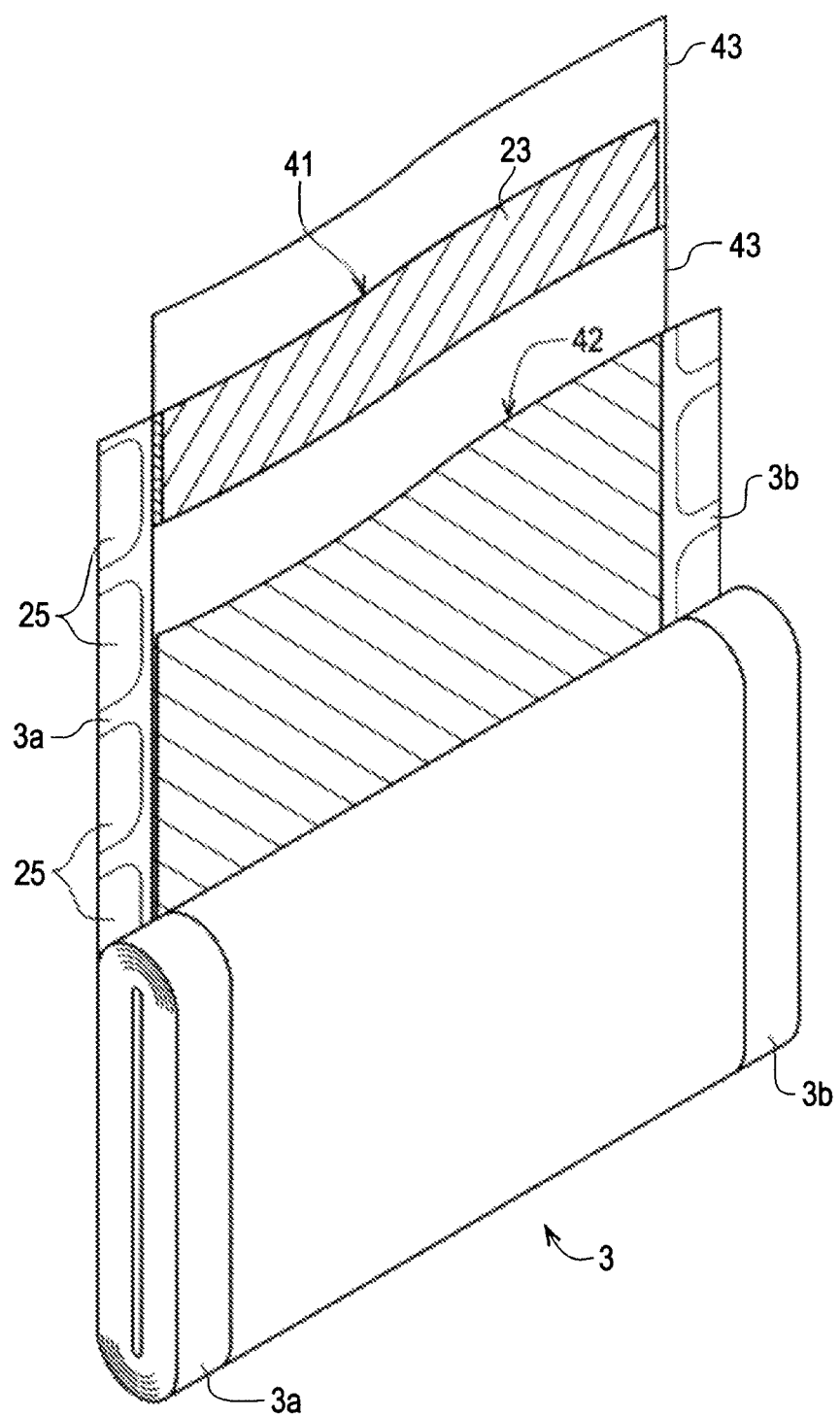
FIG. 8 is a perspective view illustrating a structure of an electrode assembly according to the embodiment of the present disclosure.

A separator 43 is sandwiched between a positive electrode side electrode 41 and a negative electrode side electrode 42 manufactured manner described above. In this state, the electrodes 41 and 42 and the separator 43 with the predetermined length are wound around a winding shaft with a flat-plate shape. This allows the electrode assembly 3 to be formed as schematically depicted in FIG. 8. In FIG. 8, the winding shaft that is to be removed after the winding is not depicted.

The separator 43 may be a polyolefin-based, polyester-based, polyacrylonitrile-based, polyphenylene sulfide-based, polyimide-based, or fluorine resin-based microporous film or nonwoven fabric, for example. The separator 43 may be treated with a surfactant or the like for improving the wettability.

[Assembly of Secondary Battery RB]

The electrode assembly 3 assembled in the above manner is incorporated to the combined product on the lid part 2 side by welding.

On the positive electrode side of the combined product on the lid part 2 side, the rivet 8 on the head side of the terminal bolt 5 penetrates through the upper gasket 11, the lid part 2, the lower gasket 12, and the current collector 4. In this state, the rivet 8 is incorporated to the lid part 2. The rivet 8 is fixed to the lid part 2 in a manner that the end part of the inside of the housing BC is caulked.

On the negative electrode side, also, the rivet 15 on the head side of the terminal bolt 7 penetrates through the upper gasket 17, the lid part 2, the lower gasket 18, and the current collector 6. In this state, the rivet 15 is incorporated to the lid part 2. The rivet 15 is fixed to the lid part 2 in a manner that the end part of the inside of the housing BC is caulked.

The uncoated region 3a of the positive electrode side electrode 41 of the electrode assembly 3 (portion where the electrode plate on the positive electrode side is exposed) is welded to the connection part 4a of the current collector 4 by ultrasonic welding or the like. The uncoated region 3b of the negative electrode side electrode 42 (portion where the copper foil is exposed) is welded to the connection part 6a of the current collector 6 by ultrasonic welding or the like.

After the electrode assembly 3 is incorporated to the combined product of the lid part 2, the combined product on the lid part 2 side is inserted into the case body 1. The edge of the lid part 2 and the opening end of the case body 1 are welded together by laser welding.

After that, steps of injecting electrolyte, initial charging, and the like are performed. Thus, the secondary battery RB is completed. The electrolyte includes, in this embodiment, a mixture solvent in which the volume ratio among ethylene carbonate (EC), dimethyl carbonate (DMC), and methyl ethyl carbonate (MEC) is 30:40:30. In this mixture solvent, $LiPF_6$ (lithium hexafluoride) is dissolved by 1 mol/L (liter).

Note that all the steps from the manufacture of the positive electrode side electrode and the negative electrode side electrode to the assembly of the secondary battery described above are performed in a dry room with the dew point of −50° C. or less.

[Evaluation on Secondary Battery RB]

Next, evaluation on a plurality of secondary batteries RB manufactured while the manufacturing condition in the above process is changed variously is described.

Here, the evaluation is made on the following two items: the stability of the battery capacity of the secondary battery RB and the separation strength of the active material layer 23 on the positive electrode side of the positive electrode side electrode.

First, the stability (degree of coincidence) of the battery capacity of the secondary battery RB is described. In the above process, as depicted in FIG. 3B, when the active material layer 23 on the positive electrode side is applied on the conductive layer 21 on the electrode plate 22 on the positive electrode side, the edge of the active material layer 23 on the positive electrode side in the width direction (direction indicated by the arrow B) spreads by the amount indicated by the distance "W" beyond the edge of the conductive layer 21 depicted with the dashed line E to the region where the electrode plate 22 on the positive electrode side is exposed.

This spreading avoids the exposure of the conductive layer 21. The exposure of the conductive layer 21 leads to the instability of the battery capacity of the secondary battery RB.

In the process of manufacturing the secondary battery RB in which the two positive electrode side electrodes are manufactured integrally as described above, the two positive electrode side electrodes that are arranged in line are cut and separated for each. On this occasion, it is preferable that the active material layers 23 on the positive electrode side in each positive electrode side electrode after cutting have the equal width of the application to each other as much as possible after the cutting. This can increase the stability of the capacity.

In the work of cutting the positive electrode side electrode, the edge position in the width direction of the electrode plate 22 on the positive electrode side (direction indicated by an arrow B in FIG. 5 or the like) is detected. The cutting position may be set based on the detected positional information. In this case, the error (error in the width direction) of the position where the active material layer 23 on the positive electrode side is applied with respect to the electrode plate 22 on the positive electrode side affects the stability of the battery capacity of the secondary battery RB.

Therefore, in the process of manufacturing the secondary battery RB, the cutting position is determined based on not the edge position in the width direction of the electrode plate 22 on the positive electrode side but the edge position in the width direction of the active material layer 23 on the positive electrode side. Note that the short-circuiting prevention layer 24 is applied at the edge position in the width direction of the active material layer 23 on the positive electrode side. This short-circuiting prevention layer 24 can be regarded as being substantially transparent. This short-circuiting prevention layer 24 hardly affects the detection of the edge position in the width direction of the active material layer 23 on the positive electrode side.

In many cases, the conductive layer 21 and the active material layer 23 on the positive electrode side have the same kind of color, so that it is difficult to optically discriminate the both accurately.

Accordingly, when the conductive layer 21 is exposed, error detection might be caused in which the edge position in the width direction of the conductive layer 21 is determined as the edge position of the active material layer 23 on the positive electrode side; in this case, the edge position in the width direction of the active material layer 23 on the positive electrode side cannot be detected accurately. Therefore, the area of the active material layer 23 on the positive electrode side on the positive electrode side electrode that has been cut and separated is not stable. As a result, the battery capacity of the secondary battery RB is instable. In this manner, the positional relationship on the positive electrode side electrode between the edge of the conductive layer 21 and the edge of the active material layer 23 on the positive electrode side affects the stability of the battery capacity of the secondary battery RB. This effect is evaluated through experiments.

The results of the evaluation experiments are in Table 1.

The secondary battery RB used in the experiments was manufactured to have the width of the application of the active material layer 23 on the positive electrode side of 90 mm and the capacity of 5 Ah.

TABLE 1

| Amount of spreading (mm) | Capacity difference (Ah) | Separation strength (N) |
| --- | --- | --- |
| −2.0 | 0.21 | 900 |
| −1.5 | 0.18 | 900 |
| −1.0 | 0.16 | 900 |
| −0.5 | 0.13 | 900 |
| 0.0 | 0.12 | 900 |
| 0.5 | 0.1 | 900 |
| 1.0 | 0.1 | 900 |
| 1.5 | 0.1 | 800 |
| 2.0 | 0.1 | 600 |
| 2.5 | 0.1 | 550 |
| 3.0 | 0.1 | 550 |

The "amount of spreading" in Table 1 corresponds to the distance "W" in FIG. 3B. The "negative amount of spreading" indicates that the edge position in the width direction of the active material layer 23 on the positive electrode side recedes as compared with the edge position in the width direction of the conductive layer 21. That is, the negative value indicates the width of the exposure of the conductive layer 21.

The "capacity difference" in Table 1 indicates the stability of the capacity of the secondary battery RB for each "amount of spreading". This value is the difference in battery capacity between the secondary batteries RB manufactured with the two positive electrode side electrodes produced by cutting and separation at the position indicated by the dot-and-dash line C in FIG. 5. In the measurement of this battery capacity, after the secondary battery RB was charged with a constant current of 5 A, the secondary battery RB was charged at a constant voltage of 4.2 V for 1.5 hours. After that, discharging at a constant current of 5 A was continued until the voltage reached 2.5 V. Based on the accumulated current value at the charging and discharging, the capacity of the secondary battery RB was obtained.

Figure 9:
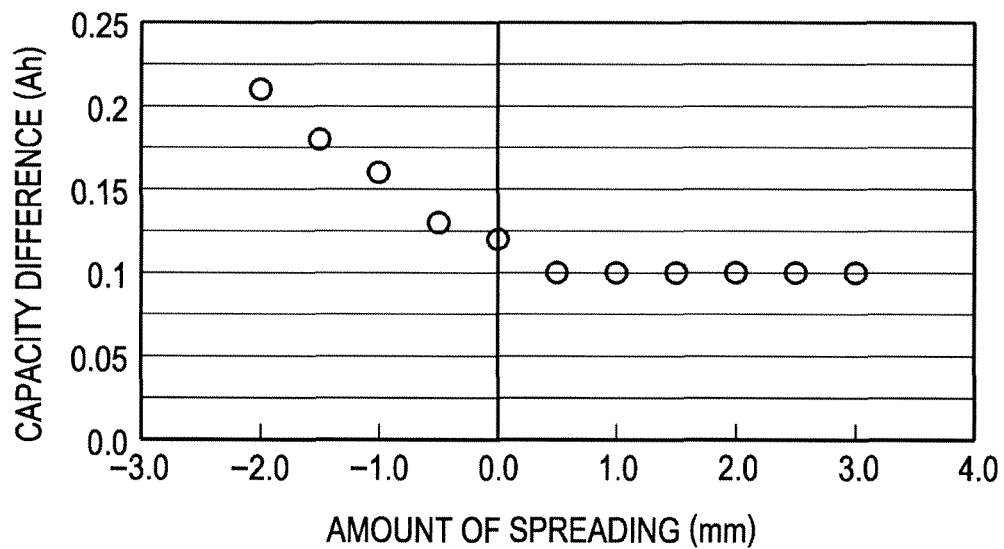
FIG. 9 is a graph showing experimental data according to the embodiment of the present disclosure.

FIG. 9 is a graph showing the relationship between the "amount of spreading" and the "capacity difference (variation in capacity)" in Table 1.

As is clear from the graph of FIG. 9, when the "amount of spreading" is negative, i.e., when the conductive layer 21 is exposed, the "capacity difference" is large. On the other hand, when the "amount of spreading" is larger than 0, i.e., when the conductive layer 21 is entirely covered with the active material layer 23 on the positive electrode side, the capacity difference is a small constant value.

Next, the evaluation on the separation strength of the active material layer 23 on the positive electrode side is described.

As described above, when the conductive layer 21 is entirely covered with the active material layer 23 on the positive electrode side, the battery capacity of the secondary battery RB is stable. However, the active material layer 23 on the positive electrode side that spreads beyond the region where the conductive layer 21 is applied is in contact with the electrode plate 22 on the positive electrode side not via the conductive layer 21. For this reason, the adhesion between the electrode plate 22 on the positive electrode side and the active material layer 23 on the positive electrode side becomes problematic.

In view of the above, the adhesion between the electrode plate 22 on the positive electrode side and the active material layer 23 on the positive electrode side was evaluated as the separation strength of the active material layer 23 on the positive electrode side. That is, how the separation strength of the active material layer 23 on the positive electrode side changes depending on the "amount of spreading" was measured.

Figure 14:
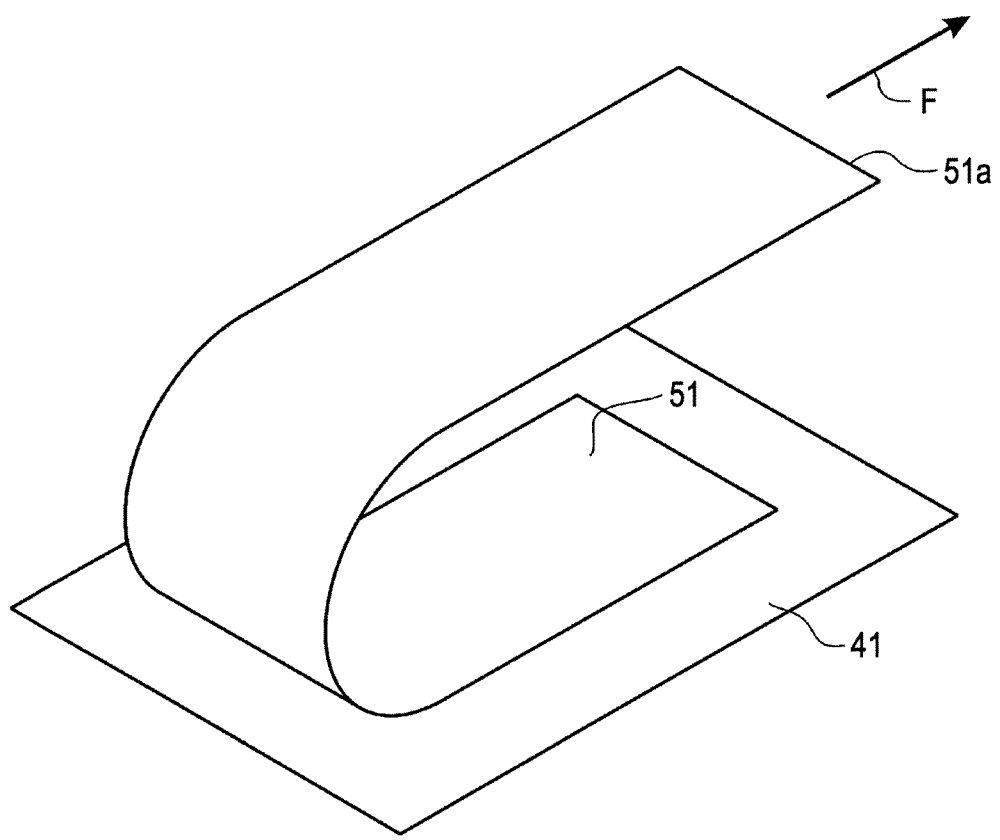
FIG. 14 is a view explaining a method of measuring separation strength.

In the measurement for the separation strength, the completed positive electrode side electrode was cut into a size of approximately 5.0 cm×3.5 cm. A tape with the width of 18 mm was attached on the vicinity of the short-circuiting prevention layer 24 so that the length of the attached portion between the tape and the positive electrode side electrode was approximately 3 cm. Then, the attached tape was removed. The force required for removing the tape was measured as the separation strength with a force gauge. FIG. 14 shows how to remove the attached tape. As depicted in this figure, an end 51a of a tape 51 attached to the positive electrode side electrode 41 is folded back. The end 51a is pulled in the direction of an arrow F after being held between ends of the force gauge. Thus, the force required for removing the tape is measured with the force gauge.

The results of measuring the separation strength are shown in the "separation strength" column of Table 1 for each "amount of spreading".

Figure 10:
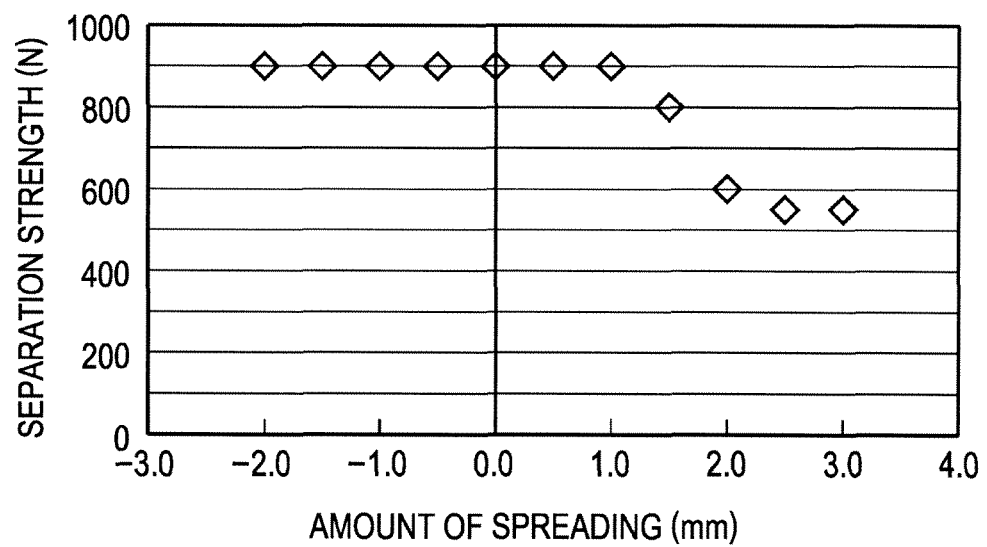
FIG. 10 is a graph showing experimental data according to the embodiment of the present disclosure.

FIG. 10 is a graph showing the relationship between the "amount of spreading" and the "separation strength" of Table 1.

When the corresponding "amount of spreading" is 0 or less, the short-circuiting prevention layer 24 is formed at the edge of the active material layer 23 on the positive electrode side that is on the conductive layer 21. In this case, the separation strength for removing the short-circuiting prevention layer 24 is measured. Therefore, the measured separation strength is a sufficiently high value, and is constant.

In contrast, when the corresponding "amount of spreading" is larger than 0 and the "amount of spreading" is 1.0 mm or less, the "separation strength" is a value equivalent to that in the case where the active material layer 23 on the positive electrode side is on the conductive layer 21. As the "amount of spreading" increases over 1.0 mm, the "separation strength" gradually decreases. It is understood that the "separation strength" is in the allowable range as long as the "amount of spreading" is 2.0 mm or less.

When the amount of spreading is more than 2.0 mm, the "separation strength" is a constant value. In this case, the actual separation strength of the active material layer 23 on the positive electrode side is as low as the background of the measurement (the force required for removal, which results from the portion other than the active material layer 23 on the positive electrode side).

In the manufacturing process described above, the width of the application of the active material layer 23 on the positive electrode side is set so that the distance between the edge position of the active material layer 23 on the positive electrode side and the edge position of the conductive layer 21 (distance indicated by "W" in FIG. 3B) is 2 mm or less. From the results of the evaluation on the "separation strength", it is more preferable that the width of the application of the active material layer 23 on the positive electrode side be set so that the distance between the edge position of the active material layer 23 on the positive electrode side and the edge position of the conductive layer 21 is 1 mm or less.

[Another Embodiment]

Another embodiment of the present disclosure is described below.

Figure 13:
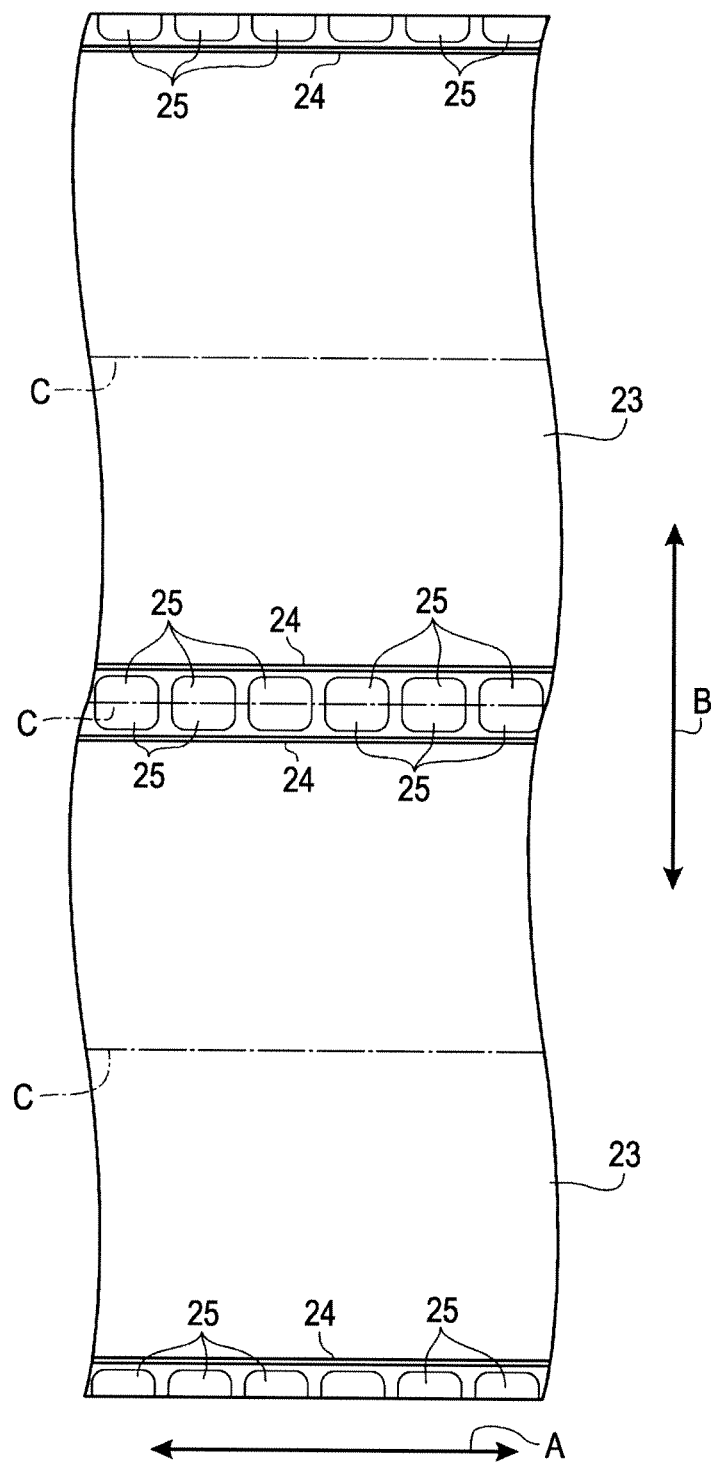
FIG. 13 depicts a process of manufacturing an electrode foil according to another embodiment of the present disclosure.

(1) In the above embodiment, the two positive electrode side electrodes are manufactured collectively. However, for example, four sets of conductive layers 21, active material layers 23 on the positive electrode side, and the like may be formed collectively as depicted in FIG. 13. In this case, in the final step, the positive electrode side electrode is cut and separated into four at the position indicated by the dot-and-dash line C. Furthermore alternatively, more sets of positive electrode side electrodes may be manufactured collectively. Note that in FIG. 13, the elements that correspond to those in FIG. 5 are denoted with the same reference numerals as those of FIG. 5.

(2) The active material layer spreading part is formed in the range along substantially the entire length of the boundary portion between the uncoated region 3a and the active material layer 23 on the positive electrode side in the longitudinal direction of the electrode plate 22 on the positive electrode side in the above embodiment. However, the active material layer spreading part may not be formed along the entire length of the boundary portion. The active material layer spreading part may be formed in the portion of the active material layer 23 on the positive electrode side that becomes the detection target for the edge position.

(3) The active material layer spreading part is formed in the range along substantially the entire length of the boundary portion between the uncoated region 3a and the active material layer 23 on the positive electrode side in the longitudinal direction of the electrode plate 22 on the positive electrode side in the above embodiment. However, the active material layer spreading part may not be formed along the entire length of the boundary portion. The active material layer spreading part may be formed only for the portion where the uncoated region 3a needs to be extended.

(4) In the above embodiment, the image of the boundary portion between the uncoated region 3a and the active material layer 23 on the positive electrode side is taken with the optical position detection unit (such as an imaging device). Based on the imaging information, the edge position of the active material layer 23 on the positive electrode side is detected. However, the method of detecting the edge position of the active material layer 23 on the positive electrode side is not limited thereto. For example, the boundary portion between the uncoated region 3a and the active material layer 23 on the positive electrode side may be scanned with a beam and its reflection light may be detected with an optical sensor. Based on the detection result (detection information), the change in amount of reflection light may be acquired, and based on the acquired results, the edge position of the active material layer 23 on the positive electrode side may be detected. Moreover, based on visible information, the edge position of the active material layer 23 on the positive electrode side may be detected. In this manner, the specific structure of the optical position detection unit may be changed variously.

(5) In the above embodiment, the press processing for suppressing the curvature of the positive electrode side electrode and the press processing for, for example, increasing the density of the active material layer on the positive electrode side are sequentially performed. A step of rolling up the electrodes in a roll form may be performed between the steps of these two kinds of press processing. Alternatively, a step of pressing the uncoated region may be performed after the step of pressing the active material layer.

(6) In the above embodiment, the conductive layer 21 is formed on the foil-form positive electrode plate (electrode plate on the positive electrode side). Depending on the relationship between the material of the negative electrode plate (electrode plate on the negative electrode side) and the material of the negative electrode active material, the conductive layer may be disposed between the negative electrode active material layer and the negative electrode plate of the negative electrode side electrode 42. In this case, the present disclosure can be applied also to the negative electrode side electrode.

(7) In the above embodiment, the electrode applicable to the nonaqueous electrolyte secondary battery is shown. However, the present disclosure is not limited to this, and the electrode and the method of manufacturing the electrode according to the present disclosure can be applied to other various secondary batteries, primary batteries, or capacitors such as electric double layer capacitors.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. An electrode comprising:
   an electrode plate in a band form that extends in a first direction and in a second direction perpendicular to the first direction;
   a conductive layer formed in a band form on the electrode plate; and
   an active material layer formed in a band form continuously on a surface of the electrode plate and on the conductive layer,
   wherein the electrode plate includes an uncoated region where a surface of the electrode plate is exposed, the uncoated region being located at an end of the electrode plate in the second direction and extending in the first direction along an entire length of the electrode plate,
   wherein the active material layer includes an active material layer spreading part adjacent the uncoated region, the active material layer spreading part being formed along substantially the entire length of the electrode plate,
   wherein an edge of the active material layer spreading part adjacent the uncoated region is located closer to the uncoated region in the second direction than an edge of the conductive layer closest to the uncoated region, and wherein the electrode further comprises a short-circuiting prevention layer which is formed on the electrode plate between the active material layer spreading part and the uncoated region, and has a thickness which is less than a thickness of the active material layer.

2. The electrode according to claim 1, wherein a distance in the second direction between the edge of the active material layer spreading part and the edge of the conductive layer closest to the uncoated region is 2 mm or less.

3. The electrode according to claim 1, wherein the short-circuiting prevention layer includes an electrical resistance which is greater than an electrical resistance of the electrode plate, and wherein the short-circuiting prevention layer is formed on a boundary portion between the active material layer and the uncoated region.

4. The electrode according to claim 1, wherein the uncoated region of the electrode plate is formed with a pressure mark.

5. A battery comprising the electrode according to claim 1.

6. The battery according to claim 5, wherein the battery comprises a nonaqueous electrolyte secondary battery.

7. The battery according to claim 5, wherein the electrode comprises a positive electrode.

8. The battery according to claim 7, wherein the active material layer comprises $LiFePO_4$.

9. The battery according to claim 5, wherein the electrode comprises a negative electrode.

10. The battery according to claim 5, wherein the electrode and a separator are wound.

11. The electrode according to claim 1, wherein the active material layer is formed continuously on the surface of the electrode plate and on the conductive layer from an end of the electrode plate to an opposing end of the electrode plate.

12. An electrode comprising:
an electrode plate that extends in a first direction and in a second direction perpendicular to the first direction, the electrode plate including an exposed surface formed at an end of the electrode plate in the second direction;
a conductive layer formed on the electrode plate;
an active material layer formed on the conductive layer and on a surface of the electrode plate which is between the conductive layer and the exposed surface of the electrode plate, the active material layer including an active material layer spreading part adjacent the exposed surface of the electrode plate, the active material layer spreading part being formed along substantially the entire length of the electrode plate; and
a short-circuiting prevention layer which is formed on the electrode plate between the active material layer spreading part and the exposed surface of the electrode plate, and has a thickness which is less than a thickness of the active material layer.

13. The electrode according to claim 12, wherein the electrode plate is formed in a band form, a length of the electrode plate in the first direction being greater than a length of the electrode plate in the second direction.

14. The electrode according to claim 12, wherein the short-circuiting prevention layer includes an electrical resistance which is greater than an electrical resistance of the electrode plate.

15. A battery comprising the electrode according to claim 12.

16. An electrode comprising:
an electrode plate that extends in a longitudinal direction and in a width direction perpendicular to the longitudinal direction, the electrode plate including an exposed surface formed at an end of the electrode plate in the width direction, and the exposed surface comprising a plurality of pressure marks formed along a length of the exposed surface in the longitudinal direction;
a conductive layer formed on the electrode plate;
an active material layer formed on the conductive layer and on a surface of the electrode plate which is between the conductive layer and the exposed surface of the electrode; and
a short-circuiting prevention layer formed on the active material layer and on a surface of the electrode plate which is between the active material layer and the exposed surface of the electrode, the short-circuiting prevention layer including an electrical resistance which is greater than an electrical resistance of the electrode plate, and including a thickness which is less than a thickness of the active material layer.

17. The electrode according to claim 16, wherein a distance in the width direction between an edge of the active material layer and an edge of the conductive layer is 2 mm or less, and a distance in the width direction between the edge of the active material layer and an edge of the plurality of pressure marks is 4 mm or less.

18. The electrode according to claim 17, wherein a thickness of the conductive layer is in a range from 1 μm to 2 μm, a thickness of the active material layer is in a range from 40 μm to 130 μm, and a thickness of the short-circuiting prevention layer is in a range from 3 μm to 15 μm.

19. The electrode according to claim 1, wherein a thickness of the short-circuiting prevention layer is greater than a thickness of the conductive layer.

20. The electrode according to claim 1, wherein the short-circuiting prevention layer comprises a binding agent and a microparticle having a diameter in a range from 1 nm to 2000 nm.

* * * * *